United States Patent
Nomizu et al.

(10) Patent No.: US 7,336,852 B2
(45) Date of Patent: Feb. 26, 2008

(54) IMAGE PROCESSING APPARATUS, IMAGE READING APPARATUS, IMAGE FORMING APPARATUS AND RECORDING MEDIUM FOR IMAGE PROCESSING PROGRAM

(75) Inventors: Yasuyuki Nomizu, Ebina (JP); Hiroyuki Sakuyama, Tokyo (JP); Junichi Hara, Yokohama (JP); Nekka Matsuura, Yokohama (JP); Takanori Yano, Yokohama (JP); Taku Kodama, Kawasaki (JP); Toshio Miyazawa, Kawasaki (JP); Yasuyuki Shinkai, Yokohama (JP); Takayuki Nishimura, Tottori (JP)

(73) Assignee: Ricoh Company, Ltd., Tokyo (JP)

(*) Notice: Subject to any disclaimer, the term of this patent is extended or adjusted under 35 U.S.C. 154(b) by 889 days.

(21) Appl. No.: 10/659,349

(22) Filed: Sep. 11, 2003

(65) Prior Publication Data
US 2005/0031215 A1 Feb. 10, 2005

(30) Foreign Application Priority Data
Sep. 12, 2002 (JP) ............................ 2002-266573

(51) Int. Cl.
*G06K 9/36* (2006.01)
(52) U.S. Cl. .............. 382/284; 382/234; 382/235; 382/243; 358/403; 358/426.04
(58) Field of Classification Search ............... 382/235, 382/243, 284, 294, 234; 358/540, 450, 403, 358/426.04, 426.16
See application file for complete search history.

(56) References Cited

U.S. PATENT DOCUMENTS

| | | | | |
|---|---|---|---|---|
| 5,465,164 A | * | 11/1995 | Sugiura et al. ............ | 382/252 |
| 5,555,099 A | * | 9/1996 | Telle ......................... | 358/401 |
| 5,687,256 A | * | 11/1997 | Kimura et al. ............. | 382/232 |
| 5,915,038 A | * | 6/1999 | Abdel-Mottaleb et al. .. | 382/209 |
| 5,917,954 A | * | 6/1999 | Girod et al. ................ | 382/248 |
| 5,982,502 A | * | 11/1999 | Jinnai ........................ | 358/296 |
| 6,040,920 A | * | 3/2000 | Ichiriki ...................... | 358/403 |
| 6,304,336 B1 | * | 10/2001 | Sugaya ...................... | 358/1.16 |
| 6,427,020 B1 | * | 7/2002 | Rhoads ....................... | 382/100 |
| 6,570,510 B2 | * | 5/2003 | Chen et al. .................. | 341/51 |
| 6,571,071 B2 | | 5/2003 | Kanoshima et al. | |
| 6,771,828 B1 | * | 8/2004 | Malvar ....................... | 382/240 |

(Continued)

FOREIGN PATENT DOCUMENTS

JP 5-75837 3/1993

(Continued)

*Primary Examiner*—Yosef Kassa
(74) *Attorney, Agent, or Firm*—Oblon, Spivak, McClelland, Maier & Neustadt, P.C.

(57) ABSTRACT

An image processing apparatus, an image reading apparatus, an image forming apparatus and a computer-readable recording-medium for storing an image processing program are disclosed. The image processing apparatus can synthesize coded data encoded in accordance with JPEG 2000 standard from source and target images at a higher speed with less use of a memory. The image processing apparatus includes a search part and an objective block synthesis part. The search part searches coded data of the source image per predetermined independently processable block for an objective block corresponding to a designated synthesis area. The objective block synthesis part synthesizes detected coded data of the objective block of the source image and coded data of the objective block of the target image.

17 Claims, 23 Drawing Sheets

U.S. PATENT DOCUMENTS

| | | | |
|---|---|---|---|
| 6,782,133 B2 * | 8/2004 | Yokose et al. | 382/232 |
| 2001/0050778 A1 | 12/2001 | Fukuda et al. | |
| 2002/0159644 A1 | 10/2002 | Sakuyama | |
| 2003/0095272 A1 | 5/2003 | Nomizu | |
| 2003/0137695 A1 | 7/2003 | Nomizu | |

FOREIGN PATENT DOCUMENTS

| | | |
|---|---|---|
| JP | 7-336675 | 12/1995 |
| JP | 2002-176561 | 6/2002 |

* cited by examiner

FIG.1
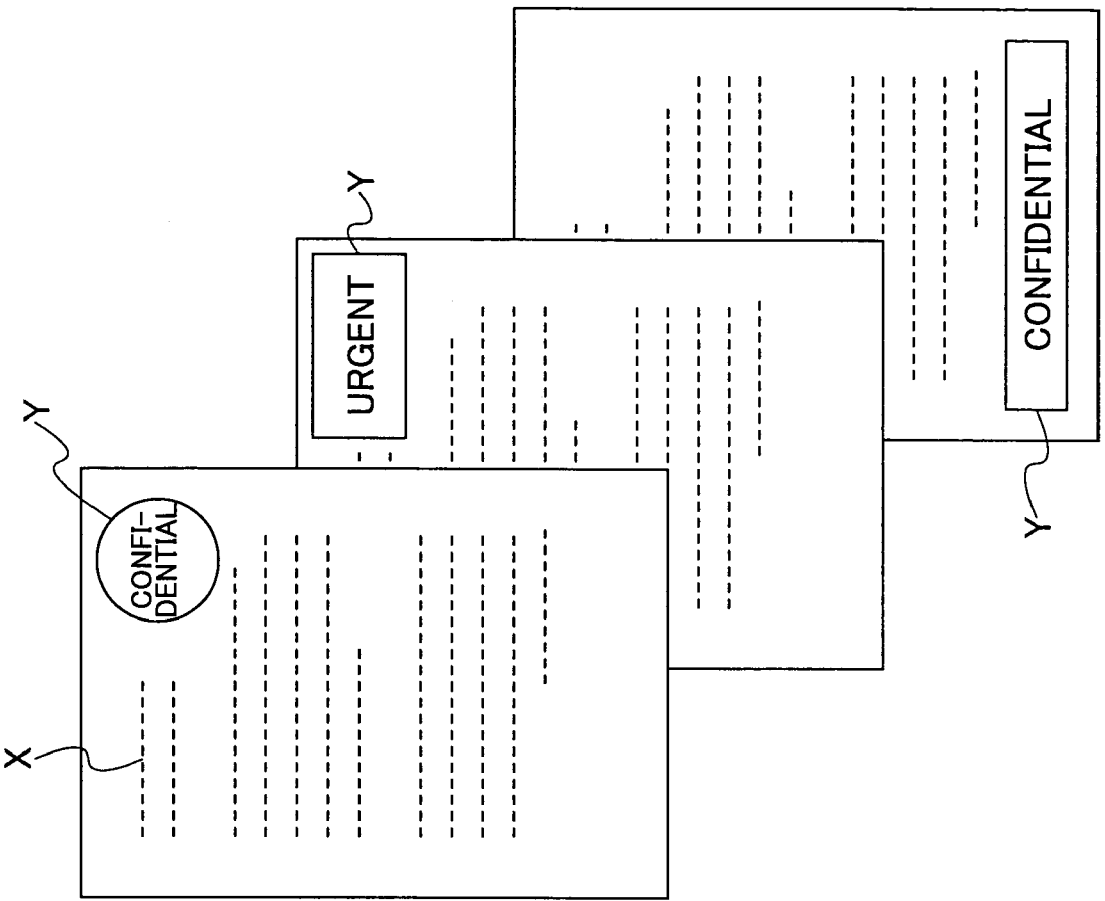
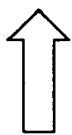
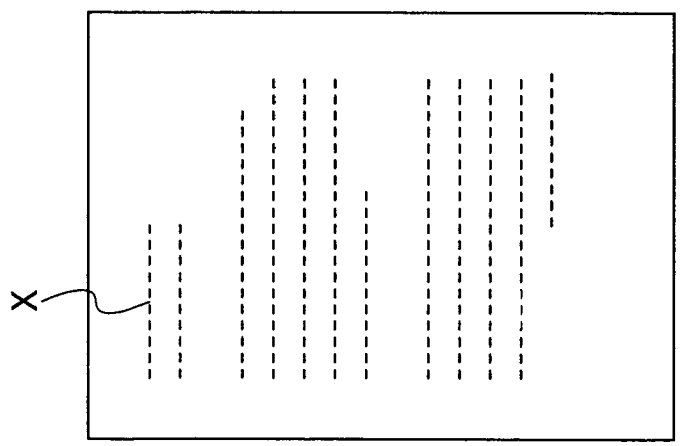

0LL
(SOURCE IMAGE TILE)

DECOMPOSITION_LEVEL_0

DECOMPOSITION_LEVEL_1

DECOMPOSITION_LEVEL_2

DECOMPOSITION_LEVEL_3

FIG.10A    FIG.10B
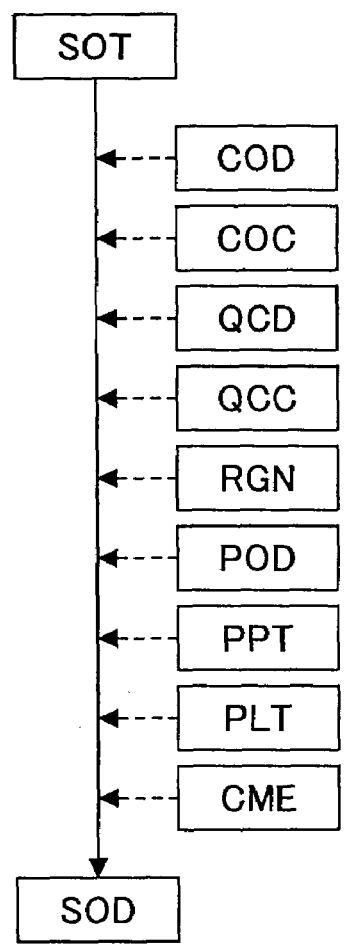
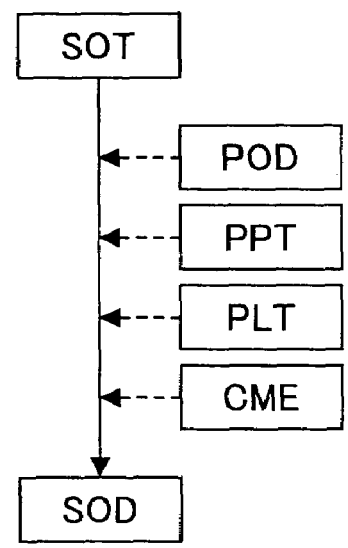
FIG.11
| SOT | Lsot | Isot | Psot | TPsot | TNsot |

FIG.12

| SIZ | Isiz | Rsiz | Nsiz | Ysiz |
|---|---|---|---|---|

| XOsiz | YOsiz | XTsiz | YTsiz |
|---|---|---|---|

| XTOsiz | YTOsiz | Csiz | Ssiz (1) | XRsiz (1) | YRsiz (1) | ... | Ssiz (n) | XRsiz (n) | YRsiz (n) |
|---|---|---|---|---|---|---|---|---|---|

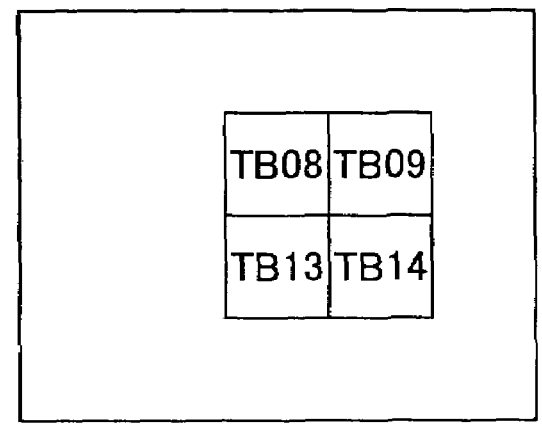
FIG.20A  SOURCE IMAGE
FIG.20B  TARGET IMAGE

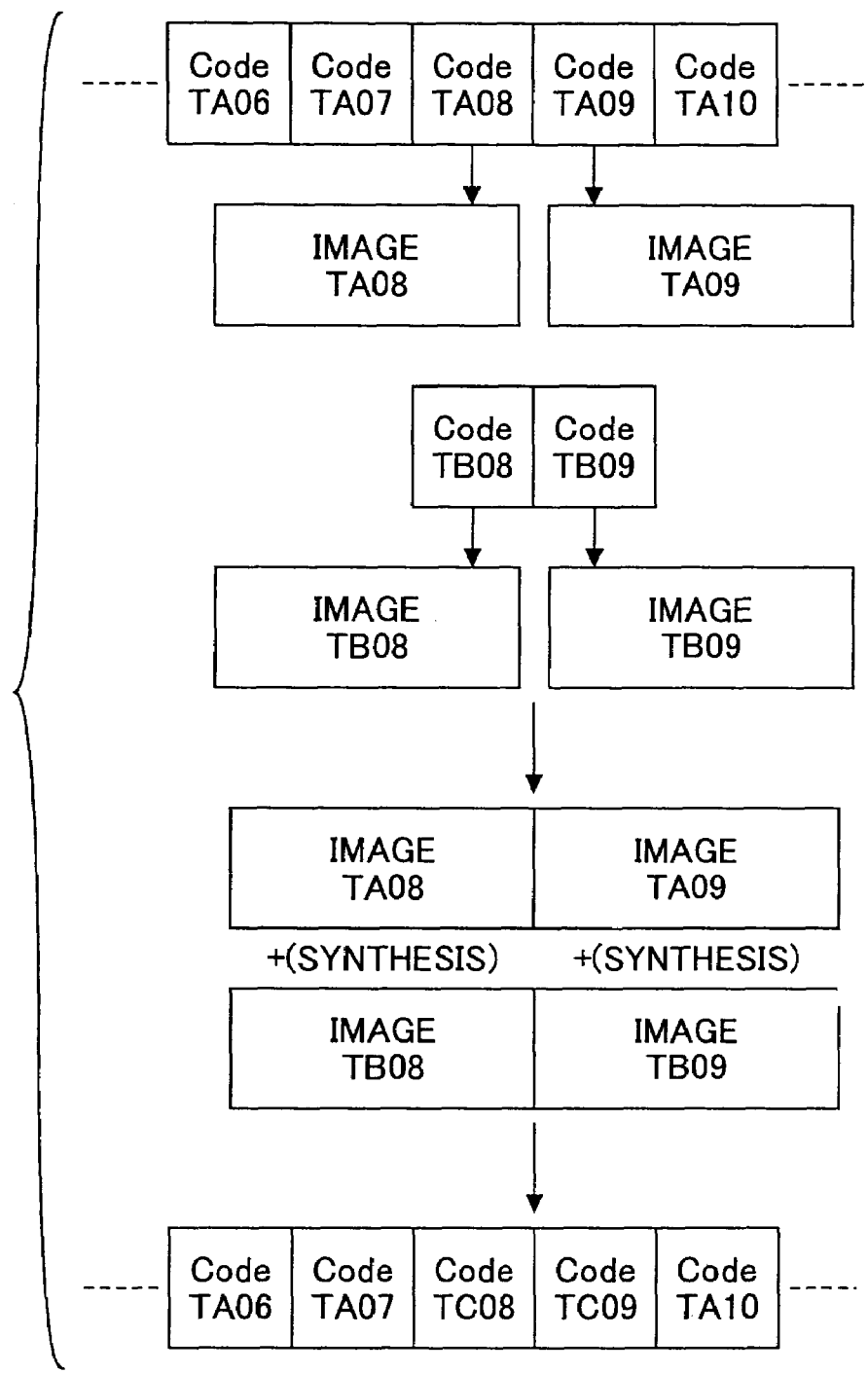

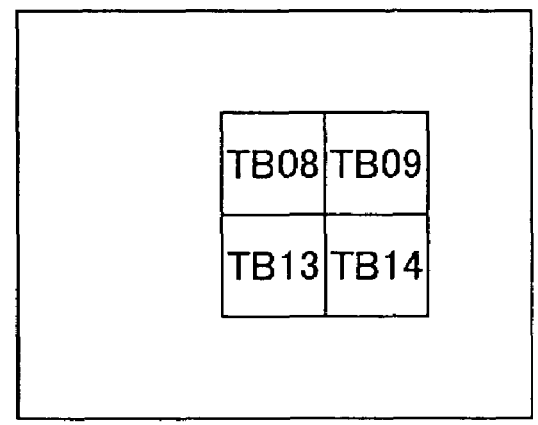
FIG.22A SOURCE IMAGE
FIG.22B TARGET IMAGE

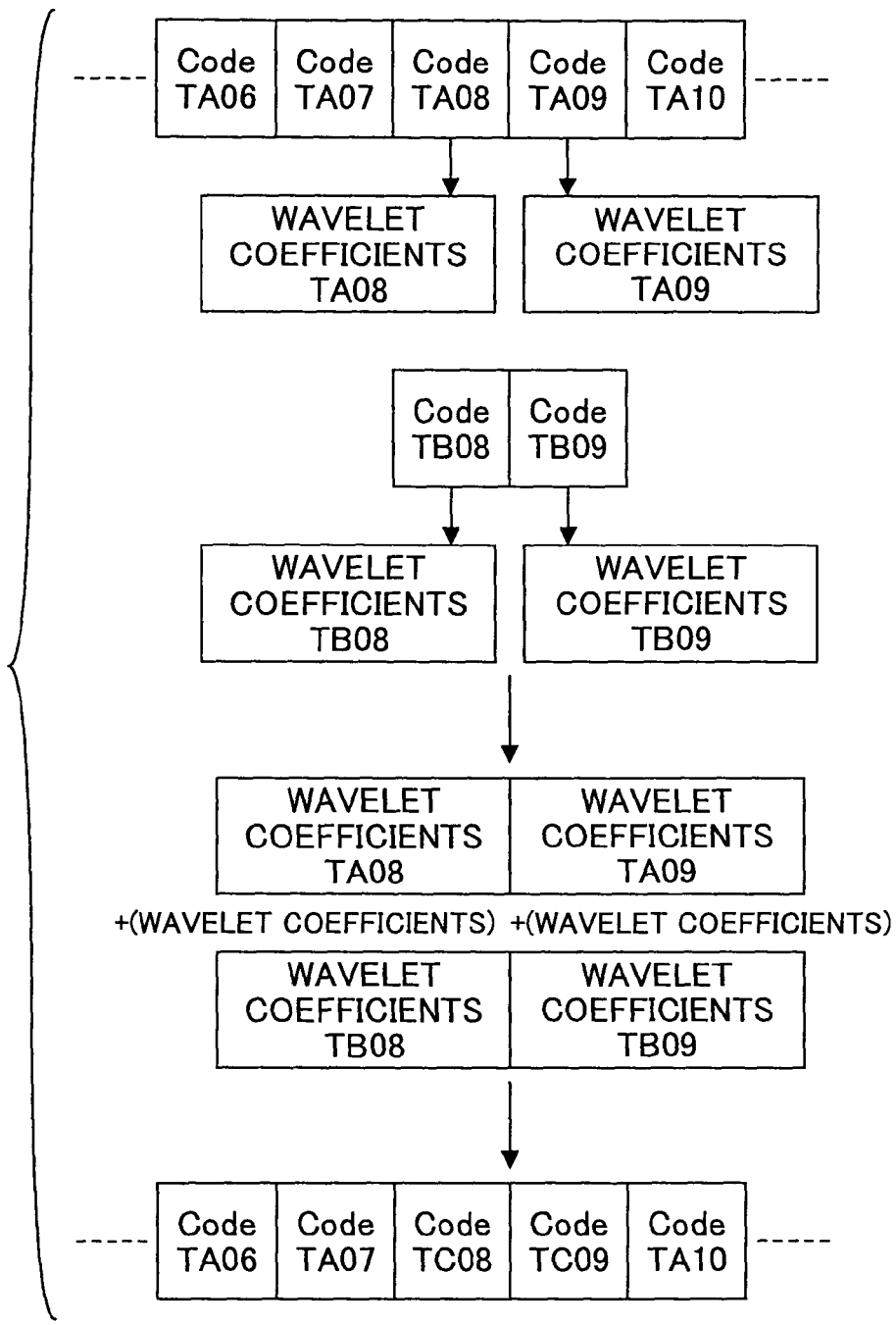

FIG. 24A SOURCE IMAGE
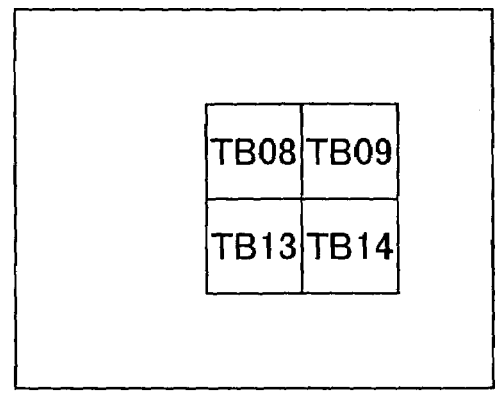
FIG. 24B TARGET IMAGE
FIG. 24C
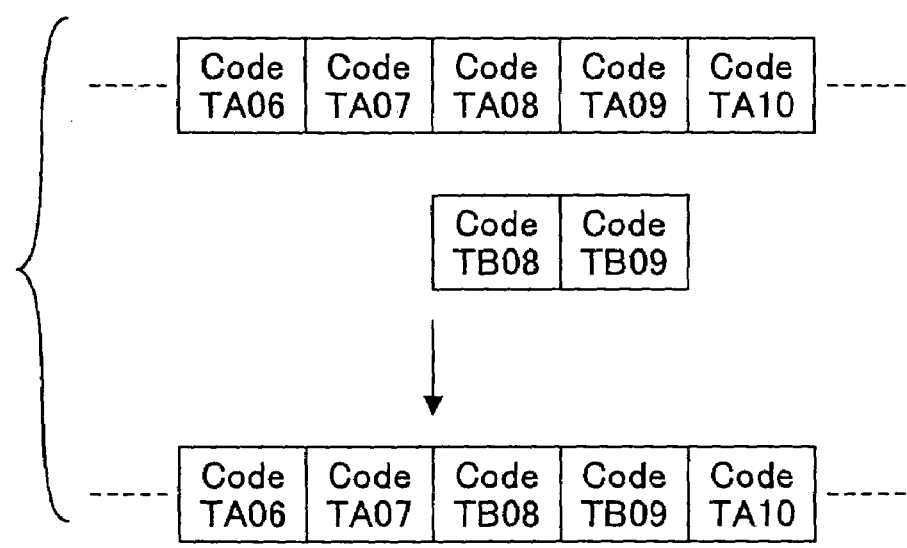

IMAGE PROCESSING APPARATUS, IMAGE READING APPARATUS, IMAGE FORMING APPARATUS AND RECORDING MEDIUM FOR IMAGE PROCESSING PROGRAM

BACKGROUND OF THE INVENTION

1. Field of the Invention

The present invention generally relates to an image processing apparatus, an image reading apparatus, an image forming apparatus and a recording medium for storing an image processing program.

2. Description of the Related Art

Recent developments of techniques associated with input and output of images have strongly stimulated a demand for higher-definition images. For example, digital still cameras, which are a kind of image input apparatuses, are in widespread use at present because of rapid price reduction of high-performance charge coupled devices (CCD), which play an integral part in the digital still cameras, that have the number of effective pixels greater than three millions. On the other hand, image output apparatuses and image display apparatuses, such as laser printers and inkjet printers, are also experiencing remarkable quality increases and drastic price decreases. In addition, such phenomena can be also observed in the field of image forming apparatuses such as copier and multifunction products (MFP).

As such higher-performance and more affordable image input and output products are offered in markets, high-definition images would become available to a greater number of peoples. In the future, it is estimated that such popularity can boost a demand for high-definition images everywhere.

Across the stream, it is predicted that there arises a growing demand for useful image compression and decompression techniques that make it possible for users to deal with high-definition images without difficulty. In an existing JPEG 2000 standard, which is one of conventional image compression and decompression schemes for high-definition images, an original image is partitioned into components and is processed per component, as appreciated by those skilled in the art. According to the JPEG 2000 standard, it is possible to decode and reconstruct a high quality image from its underlying compressed image even if the underlying image is compressed at a high compression rate.

There is an increasing tendency to equip an image forming apparatus, such as a copier and a multifunction product, with compression and decompression techniques such as the JPEG 2000 standard for the purpose of less memory consumption. Such an image forming apparatus compresses an original image, which is read by an image reading device installed in the image forming apparatus, and stores the coded image data in a working memory for the moment. Then, when the image is about to be printed out, the image forming apparatus decompresses the coded image data in accordance with the reverse compression procedure, that is, the decompression procedure, and supplies the decoded image data to a printer part thereof to output the underlying image.

In addition, some of copiers and multifunction products of today have various useful functions. Among such functions, there is an image synthesis function to synthesize two images.

FIG. 1 shows an example for explaining a conventional image synthesis process. As shown in FIG. 1, for example, such an image forming apparatus having an image synthesis function can superpose a pattern image Y, such as "URGENT", "CONFIDENTIAL" and a company logo, onto a desired position of an original image X, and output the synthesized image. Throughout this specification, the term "image synthesis" is not limited to syntheses of given original images, such as superposition of an overlapping portion the original images each other or reverse of a superposed portion of the original images. The image synthesis according to the specification includes various types of syntheses, for example, superposition of a pattern image, which is stored in a memory in advance, onto a given original image. For example, a ruled line image is provided as such a pattern image to an image forming apparatus in advance. In this case, when receiving a given document, the image forming apparatus can produce a synthesized form document such that the original document is adequately superposed on the ruled lines.

Conventionally, in order to synthesize coded images, an image forming apparatus decodes the coded images into their underlying images and synthesizes the decoded images, for example, through bitmap expansion, as appreciated by those skilled in the art. Then, the image forming apparatus encodes the synthesized image again and produces the resulting encoded image as a result of the synthesis However, such a synthesis process requires a large processing time, because the resulting encoded image is obtained through the decoding process, the image synthesis process, and the encoding process. In addition, when the image forming apparatus decodes a target coded image into its underlying image, it is necessary to prepare a working memory to temporarily store the decoded image data for the image forming apparatus. In particular, when the image forming apparatus decodes coded data of the whole image, the image forming apparatus has to include an additional working memory such as a page memory.

SUMMARY OF THE INVENTION

It is a general object of the present invention to provide an image processing apparatus in which one or more of the above-mentioned problems are eliminated.

A more specific object of the present invention is to provide an image processing apparatus that can synthesize coded data encoded from a source image and a target image in accordance with the JPEG2000 standard with less use of a working memory at a higher speed.

In order to achieve the above-mentioned objects, there is provided according to one aspect of the present invention an image processing apparatus for synthesizing a source image and a target image by positioning the target image in a designated synthesis area in the source image, including: a search part searching coded data of the source image per predetermined independently processable block for an objective block corresponding to the designated synthesis area; and an objective block synthesis part synthesizing detected coded data of the objective block of the source image and coded data of the objective block of the target image, wherein the coded data are encoded in accordance with a JPEG 2000 standard.

According to one aspect of the present invention, the inventive image processing apparatus makes the most use of the JPEG 2000 standard. Specifically, since the JPEG 2000 standard adopts an arbitrarily sized (rectangular) "block" as a process unit, it is possible to identify coded data corresponding to an image portion (objective block) to be synthesized. In addition, when the coded data are not associated with other blocks so that the objective block can be not affected by other blocks through wavelet transform/inverse wavelet transform, in other words, when the objective block can be independently processed, it is possible to decode the coded data of the objective block independently of other blocks. For this reason, if coded data are searched for a synthesis area per predetermined block, and a synthesis process is performed on coded data of an objective block corresponding to the synthesis area, it is unnecessary to decode coded data of the whole image. Accordingly, the inventive image processing apparatus can operate at a higher speed with less use of a working memory.

In an embodiment of the present invention, the objective block synthesis part may include a coded data replacement part replacing the coded data of the objective block of the source image with the coded data of the objective block of the target image.

According to one aspect of the present invention, if a target image is attached to a white background of a source image, it is possible to perform a synthesis process simply by replacing coded data of an objective block of the source image with coded data of the objective block of the target image. As a result, it is possible to perform the synthesis process on the coded data without any conversion into its underlying image data. In such a case, since the inventive image processing apparatus does not have to encode and decode data at all, the image processing apparatus not only can operate at a further higher speed but also needs no working memory for decoding.

In an embodiment of the present invention, the image processing apparatus may further include: an encoder encoding image data into coded data by performing two-dimensional wavelet transform, quantization and encoding on the image data in accordance with the JPEG 2000 standard; and a decoder decoding the coded data into the image data by performing inverse two-dimensional wavelet transform, dequantization and decoding on the coded data in accordance with the JPEG 2000 standard.

In an embodiment of the present invention, the objective block synthesis part may include: an objective image reconstruction part using the decoding part to decode the coded data of the objective block of the source image into image data of the objective block of the source image and the coded data of the objective block of the target image into image data of the objective block of the target image; an objective image synthesis part synthesizing the decoded image data of the objective block of the source image and the decoded image data of the objective block of the target image; and an objective image re-encoding part using the encoding part to encode the synthesized image data of the objective block into synthesized coded data again and replacing the original coded data of the objective block of the source image with the synthesized coded data.

According to one aspect of the present invention, if a synthesis process is not accomplished through simple replacement, such as in superposition of two images, the inventive image processing apparatus achieves the synthesis process by decoding just coded data of an objective block into image data without decoding code data of the whole image. As a result, the inventive image processing apparatus can operate at a higher speed with less use of a working memory compared to the case where the coded data of the whole image are decoded.

In an embodiment of the present invention, the objective block synthesis part may include: an objective wavelet coefficient reconstruction part using the decoding part to perform the two-dimensional wavelet transform on the coded data of the objective block of the source image and the coded data of the objective block of the target image, thereby reconstructing a wavelet coefficient of the objective block of the source image and a wavelet coefficient of the objective block of the target image; an objective wavelet coefficient synthesis part synthesizing the reconstructed wavelet coefficient of the objective block of the source image and the reconstructed wavelet coefficient of the objective block of the target image: and an objective wavelet coefficient re-encoding part using the encoding part to encode the synthesized wavelet coefficient of the objective block into synthesized coded data again and replacing the original coded data of the objective block of the source image with the synthesized coded, data.

According to one aspect of the present invention, coded data of an objective block are not thoroughly decoded. The coded data are just inverse wavelet transformed into a wavelet coefficient. The inventive image processing apparatus performs a synthesis process on the wavelet coefficient and then encodes synthesized coded data of the objective block again. As a result, the image processing apparatus can operate at a higher speed with less use of a working memory compared to the case where the coded data of the objective block are thoroughly decoded into image data.

In an embodiment of the present invention, the block may include a tile having header information.

According to one aspect of the present invention, when a rectangular tile resulting from partition of an image is used as a block unit for a synthesis process, it is possible to takes advantages of the JPEG 2000 standard.

In an embodiment of the present invention, the block may include a precinct.

According to one aspect of the present invention, it is possible to perform a synthesis process per precinct, which is smaller than a tile.

In an embodiment of the present invention, the block may include a codeblock.

According to one aspect of the present invention, it is possible to perform a synthesis process per codeblock, which is smaller than a precinct.

In an embodiment of the present invention, the objective block synthesis part, when at least one of the source image and the target image is a color image, may include a color image processing part providing weights to a luminance signal component and a color difference signal component of the source image so that a luminance signal component of a synthesized image has a smaller quantization step size than a color difference signal component thereof does.

According to one aspect of the present invention, if a source image or a target image is a color image, the luminance component of the color image significantly affects the image quality of a synthesized image in general. However, it is possible to improve the image quality by providing appropriate weights to the luminance component and the color difference component of the source image.

In an embodiment of the present invention, the image processing apparatus may further include an output part outputting synthesized coded data to an exterior thereof.

According to one aspect of the present invention, it is possible to use a synthesized image in an external computer, for example.

Additionally, there is provided according to another aspect of the present invention an image reading apparatus, including: a photoelectric conversion element reading an image and generating image data from the image; a coding part encoding the image data into coded data and decoding the coded data into the image data in accordance with a JPEG 2000 standard; a storage part maintaining coded data; and an image processing apparatus for synthesizing a source image and a target image by positioning the target image in a designated synthesis area in the source image, including: a search part searching coded data of the source image per predetermined independently processable block for an objective block corresponding to the designated synthesis area; and an objective block synthesis part synthesizing detected coded data of the objective block of the source image and coded data of the objective block of the target image, wherein the storage part maintains at least one of coded data encoded from the source image and coded data encoded from the target image.

According to one aspect of the present invention, it is possible to provide an image reading apparatus that can synthesize coded data encoded from a source image and a target image in accordance with the JPEG 2000 standard at a higher speed with less use of a working memory.

Additionally, there is provided according to another aspect of the present invention an image forming apparatus, including: an image reading apparatus, including: a photoelectric conversion element reading an image and generating image data from the image; a coding part encoding the image data into coded data and decoding the coded data into the image data in accordance with a JPEG 2000 standard; a storage part maintaining coded data; and an image processing apparatus for synthesizing a source image and a target image by positioning the target image in a designated synthesis area in the source image, including: a search part searching coded data of the source image per predetermined independently processable block for an objective block corresponding to the designated synthesis area; and an objective block synthesis part synthesizing detected coded data of the objective block of the source image and coded data of the objective block of the target image, wherein the storage part maintains at least one of coded data encoded from a source image and coded data encoded from a target image; and a printer engine forming an image on a paper based on image data decoded from output coded data of the image reading apparatus by the coding part.

According to one aspect of the present invention, it is possible to provided an image forming apparatus that can synthesize coded data encoded from a source image and a target image in accordance with the JPEG 2000 standard and then print out a synthesized image at a higher speed with less use of a working memory.

Additionally, there is provided according to another aspect of the present invention a computer-readable recording medium for storing a program to cause a computer of an image processing apparatus to execute a procedure of processing an image wherein the image processing apparatus is for synthesizing a source image and a target image by positioning the target image in a designated synthesis area in the source image, the procedure including: a search function searching coded data of the source image per predetermined independently processable block for an objective block corresponding to the designated synthesis area; and an objective block synthesis function synthesizing detected coded data of the objective block of the source image and coded data of the objective block of the target image, wherein the coded data are encoded in accordance with a JPEG 2000 standard.

According to one aspect of the present invention, the inventive image processing apparatus can be implemented through execution of a computing device thereof in accordance with the above image processing program accommodated in the computer-readable recording medium.

Other objects, features and advantages of the present invention will become more apparent from the following detailed description when read in conjunction with the accompanying drawings.

BRIEF DESCRIPTION OF THE DRAWINGS

FIG. 1 is a diagram illustrating an example for explaining a conventional image synthesis process;

FIGS. 10A and 10B are diagrams illustrating exemplary structures of a tile-part header in accordance with the JPEG 2000 standard;

FIG. 11 is a diagram illustrating an exemplary structure of a SOT marker segment in accordance with the JPEG 2000 standard;

FIG. 12 is a diagram illustrating an exemplary structure of a SIZ marker segment in accordance with the JPEG 2000 standard;

FIGS. 20A through 20C are diagrams illustrating an example for explaining the image synthesis process according to the first embodiment;

FIGS. 22A through 22C are diagrams illustrating an example for explaining the image synthesis process according to the second embodiment;

FIGS. 24A through 24C are diagrams illustrating an example for explaining the image synthesis process according to the third embodiment.

DETAILED DESCRIPTION OF THE PREFERRED EMBODIMENTS

In the following, embodiments of the present invention will be described with reference to the accompanying drawings.

An overview is presented, with reference to FIG. 2 through FIG. 15, of the JPEG 2000 standard.

Figure 2:
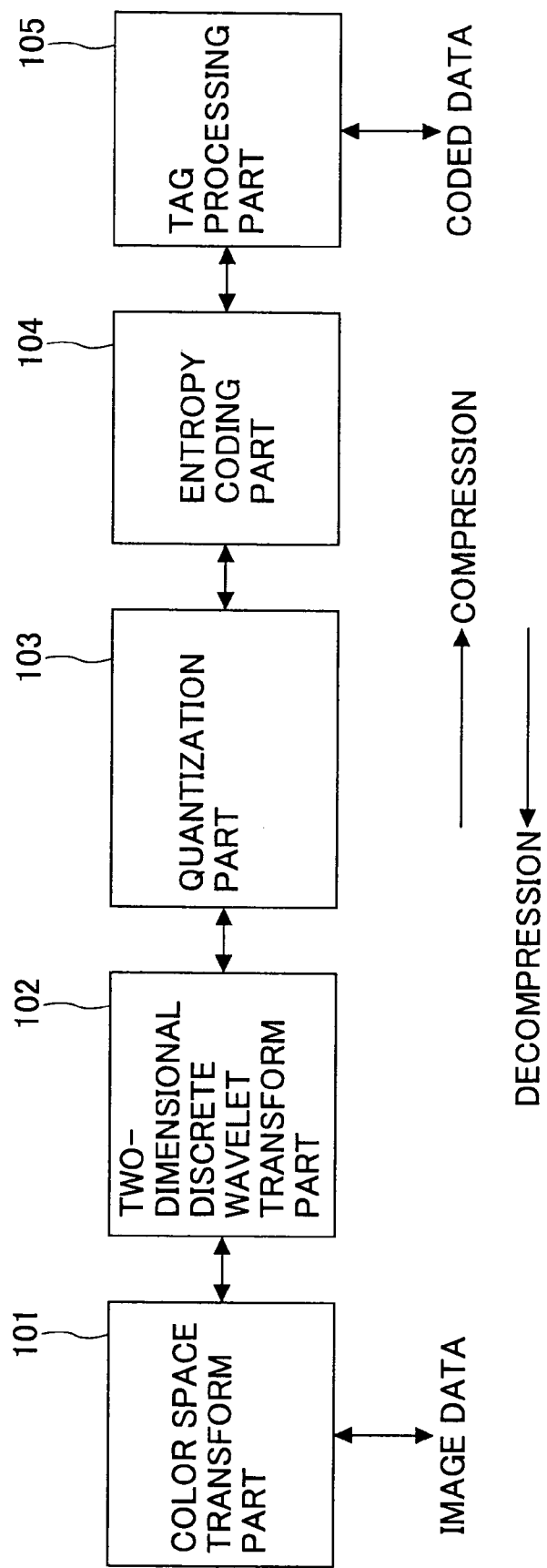
FIG. 2 is a block diagram of exemplary functional components of a JPEG 2000 coding system.

FIG. 2 is a block diagram of exemplary functional components of a JPEG 2000 coding system. Referring to FIG. 2, the JPEG 2000 coding system comprises a color space transform part 101, a two-dimensional discrete wavelet transform part 102, a quantization part 103, an entropy coding part 104, and a tag processing part 105. Here, each of these parts can perform bidirectional processes: compression and decompression, as described in detail below.

Figure 3:
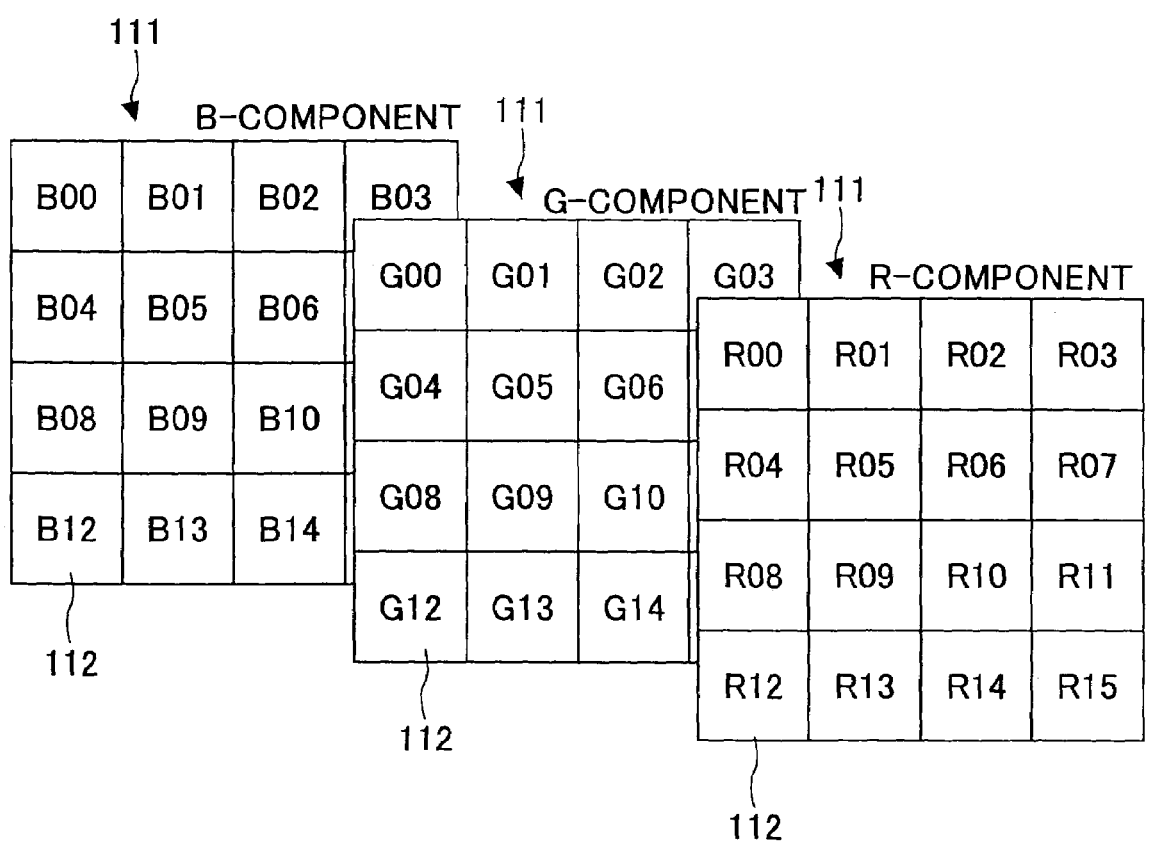
FIG. 3 is a diagram illustrating exemplary components that result from partition of a source color image.

FIG. 3 shows exemplary components that result from partition of a source color image. Referring to FIG. 3, the source color image is decomposed into an R-component, a G-component and a B-component, which are collectively designated by the reference number 111. It will be understood by those skilled in the art that these components are generated based on an RGB chromatic system. Furthermore, each of these components is partitioned into non-overlapping rectangular blocks, which are referred to as tiles 112. For example, the R-component is partitioned into tiles R00 through R15 as illustrated in FIG. 3. Similarly, the G-component and the B-component are partitioned into G00 through G15 and B00 through B15, respectively. In the JPEG 2000 standard, compression or decompression is performed on individual tiles 112. In other words, a tile 112 is a fundamental component for coding processes based on the JPEG 2000 standard.

When a source color image is provided to the JPEG 2000 coding system, first, individual tile data of the color image are supplied to the color space transform part 101. After the color space transformation, the resulting data are supplied to the two-dimensional discrete wavelet transform part 102. The two-dimensional discrete wavelet transform part 102 spatially decomposes the supplied data into frequency bands through (forward) two-dimensional discrete wavelet transformation.

Figure 4A:
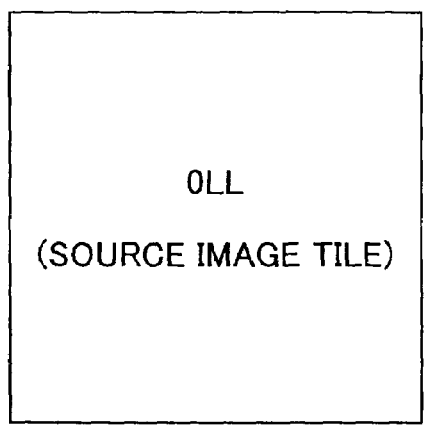
FIGS. 4A through 4D are diagrams illustrating subbands of each of decomposition levels 0 through 3.
Figure 4B:
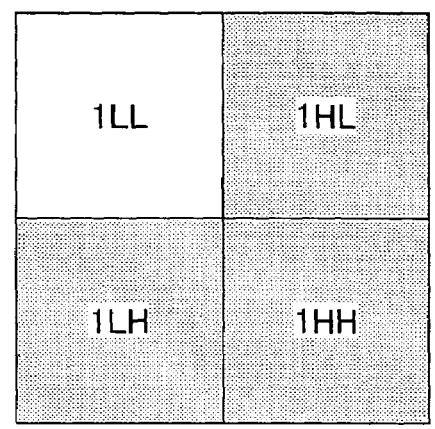
Figure 4C:
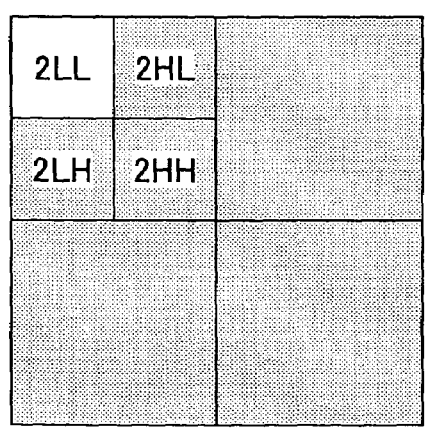
Figure 4D:
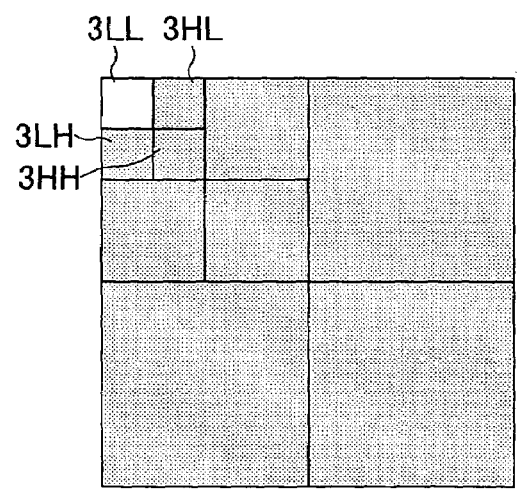

FIGS. 4A through 4D show subbands of each of decomposition levels 0 through 3. The two-dimensional discrete wavelet transform part 102 performs two-dimensional discrete wavelet transform on a source image tile 0LL that results from tile partition of its underlying image under the decomposition level 0 shown in FIG. 4A, thereby obtaining decomposed blocks, which are referred to as "subbands", 1LL, 1HL, 1LH and 1HH of the decomposition level 1 as illustrated in FIG. 4B. Subsequently, the two-dimensional discrete wavelet transform part 102 performs two-dimensional discrete wavelet transform on the low-frequency subband 1LL, thereby obtaining decomposed subbands 2LL, 2HL, 2LH and 2HH of the decomposition level 2 as illustrated in FIG. 4C. Furthermore, the two-dimensional discrete wavelet transform part 102 performs two-dimensional discrete wavelet transform on the low-frequency subband 2LL, thereby obtaining decomposed subbands 3LL, 3HL, 3LH and 3HH of the decomposition level 3 as illustrated in FIG. 4D. In FIGS. 4A through 4D, hatched subbands are encoded in the decomposition levels thereof. For example, under the decomposition level 3, hatched subbands 3HL, 3LH, 3HH, 2HL, 2LH, 2HH, 1HL, 1LH and 1HH are encoded, and the subband 3LL is not encoded.

After such discrete wavelet transformation, the resulting wavelet coefficients are supplied to the quantization part 103. An objective bit to be encoded is determined based on designated encoding order, and the quantization part 103 generates a context from neighbors of the objective bit.

Figure 5:
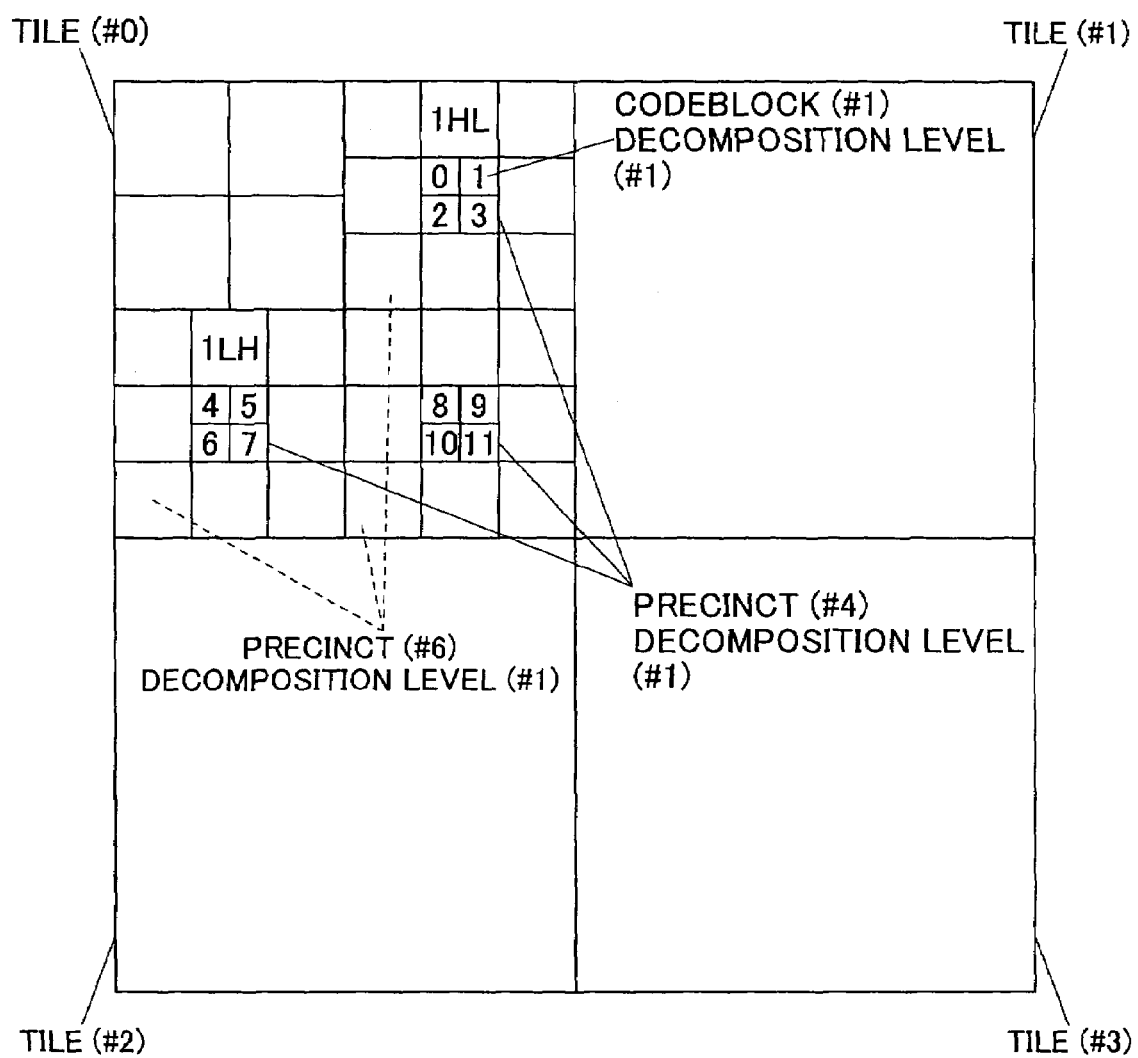
FIG. 5 is a diagram illustrating exemplary precincts.

FIG. 5 shows exemplary precincts. For each subband, quantized wavelet coefficients are decomposed into rectangular non-overlapping blocks, which are referred to as "precincts", as illustrated in FIG. 5. Such a precinct is adopted to make efficient use of a memory during implementation. As shown in FIG. 5, a precinct comprises three spatially consistent rectangles. Furthermore, each precinct is partitioned into rectangular non-overlapped "codeblocks". A codeblock is a fundamental component in an entropy coding process based on the JPEG 2000 standard. It is expected that the above description are familiar to those skilled in the art.

Figure 6:
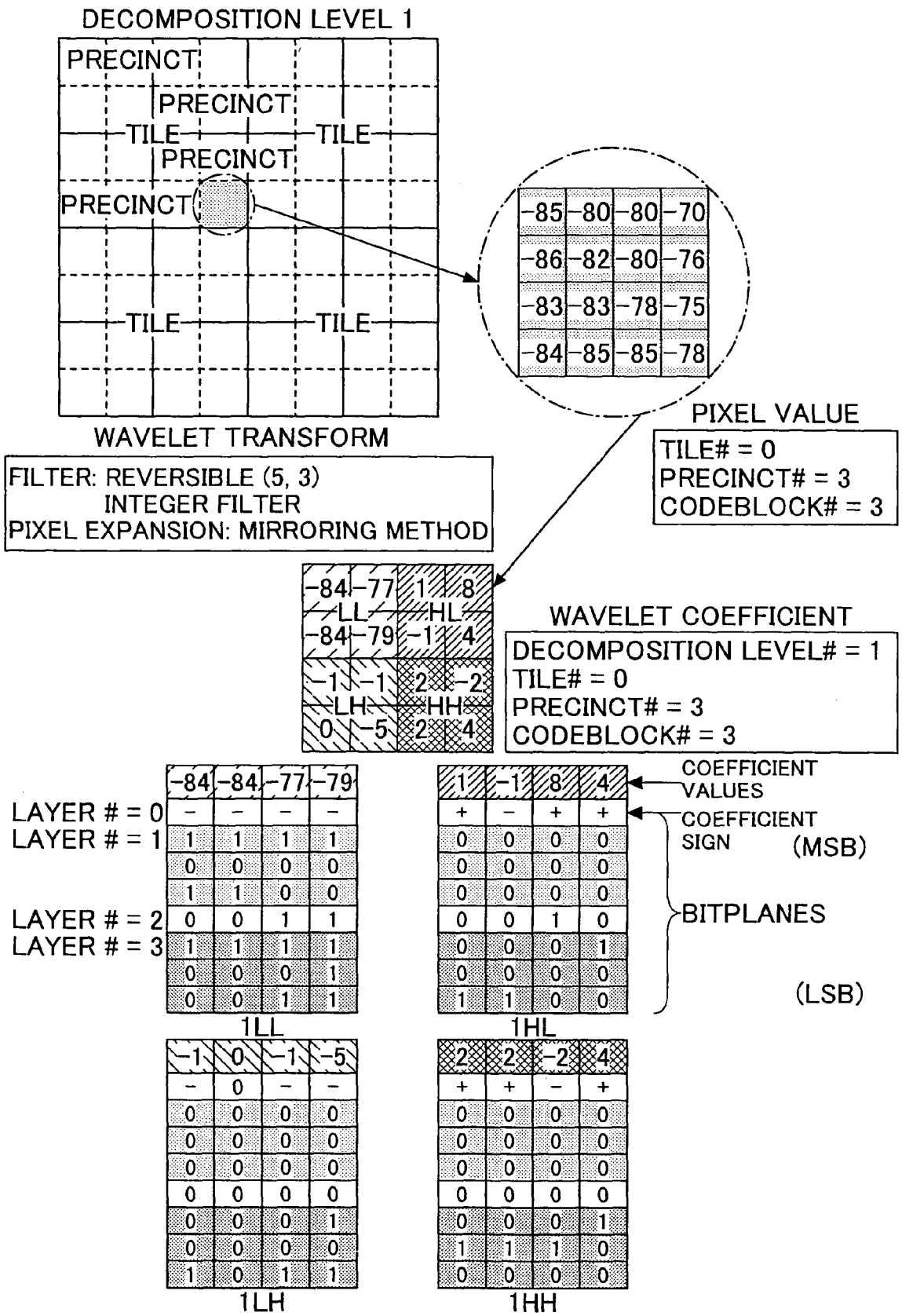
FIG. 6 is a diagram illustrating an example for explaining a method of ordering bitplanes.

FIG. 6 is a diagram illustrating an example for explaining a method of ordering bitplanes. After two-dimensional discrete wavelet transformation, wavelet coefficients may be directly quantized. In order to improve coding efficiency, however, the JPEG 2000 standard decomposes each wavelet coefficient into "bitplanes". Then, the decomposed bitplanes are ordered for each pixel or codeblock. FIG. 6 illustrates this procedure. Each wavelet coefficient is decomposed into bitplanes after two-dimensional discrete wavelet transformation, and then the bitplanes are ordered per pixel or codeblock. In the illustrative example, a source image (32×32 pixels) is partitioned into four tiles (16×16 pixels). Each precinct comprises 8×8 pixels, and each codeblock comprises 4×4 pixels. The precincts and the codeblocks are numbered in raster order, as appreciated by those skilled in the art. Also, a mirroring method is used for pixel expansion toward the outside of tile boundaries. Wavelet transform is performed by a reversible (5, 3) filter to obtain wavelet coefficients of the decomposition level 1.

In addition, FIG. 6 illustrates an exemplary structure of typical "layers" for the codeblock 3 of the precinct 3 of the tile 0. When one observes a wavelet coefficient from a bitplane direction, it is easy to understand the layer structure. In the illustrative example, the layer 0 has the sign of a wavelet coefficient, the layer 1 has three bitplanes, the layer 2 has one bitplane, and the layer 3 has three bitplanes. While a layer having the least significant bitplane (LSB) is quantized the earliest, a layer having the most significant bitplane (MSB) is quantized the last. Such a method, which is called "truncation", makes it possible to finely adjust a quantization rate.

The entropy coding part 104 encodes a tile 112 for each RGB components based on probability estimation on a context and an objective bit. In this fashion, the coding process is performed per tile 112 for each RGB component of a source image.

Figure 7:
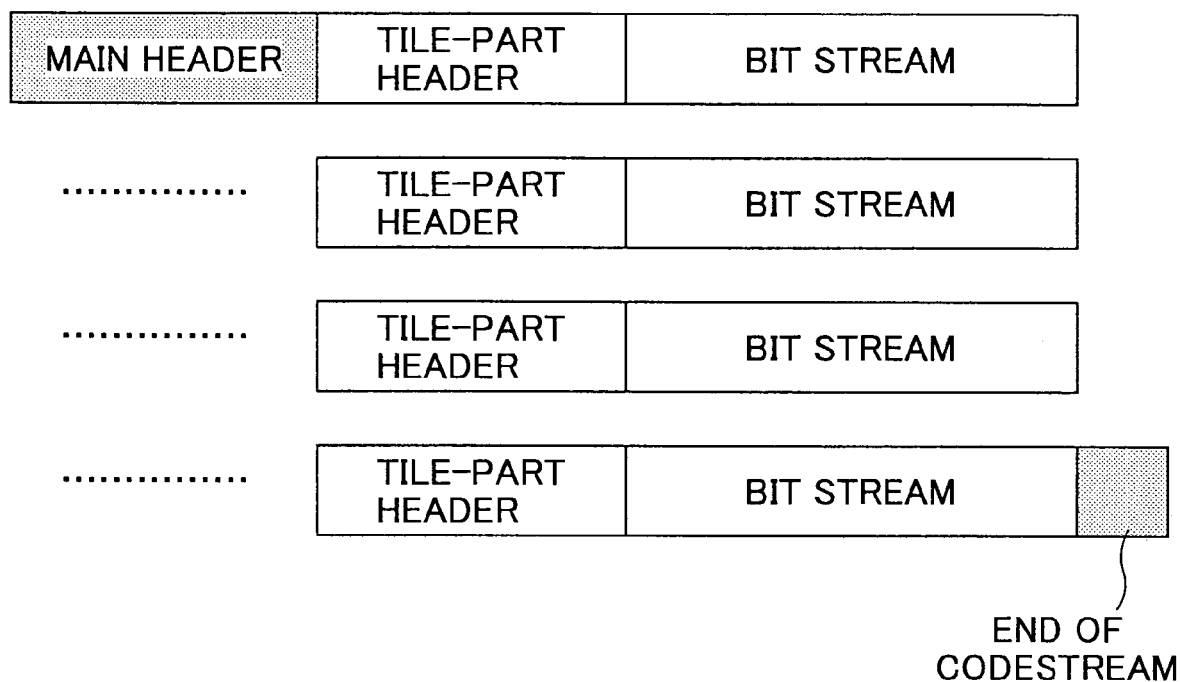
FIG. 7 is a diagram illustrating an exemplary structure of a codestream of coded data.

After receiving coded data from the entropy coding part 104, the tag processing part 105 integrates all the coded data into a codestream as illustrated in FIG. 7, and then attaches tags to the codestream.

FIG. 7 shows an exemplary structure of a codestream of coded data. Referring to FIG. 7, tag information, which is called a "header", is attached to the head of the codestream and the heads of tile-parts constituting each tile 112. Each tile-part header is followed by coded data of the tile 112. In addition, the tag processing part 105 attaches a tag to the end of the codestream.

On the other hand, in order to inversely decode coded image into the underlying image data, the image data are generated from a codestream of individual tiles 112 of RGB components. The tag processing part 105 interprets tag information attached to a given codestream, and decomposes the codestream into individual codestreams of tiles 112 of RGB components, on which the decoding process is performed. At this time, an objective bit to be decoded is determined in order based on tag information of the codestream. The quantization part 103 generates a context based on (decoded) adjacent bits of the objective bit. The entropy coding part 104 decodes the objective bit through a decoding process based on probability estimation from the context and the codestream, and stores the resulting decoded data in the position of the objective bit. Such decoded data are spatially divided for each frequency band. If the two-dimensional discrete wavelet transform part 102 performs reverse two-dimensional discrete wavelet transform on the decoded data, tiles of RGB components of the image data are reconstructed. Then, the color space transform part 101 converts the reconstructed image data into data corresponding to an original color representation system.

Figure 8:
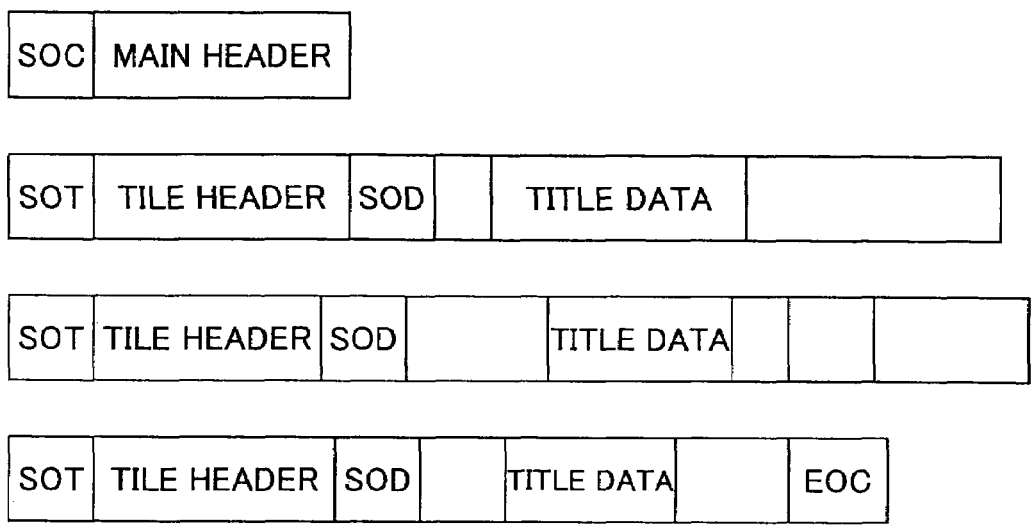
FIG. 8 is a diagram illustrating an exemplary coded format in accordance with the JPEG 2000 standard.

FIG. 8 shows an exemplary coded format in accordance with the JPEG 2000 standard. Referring to FIG. 8, the coded format includes a SOC (Start Of Codestream) marker at the head therof. Subsequently, a main header for coding parameters and quantization parameters is provided. The main header is followed by coded data. Such coded data further includes a SOT (Start Of Tile-part) marker, a tile header, a SOD (Start Of Data) marker, and tile data in this order. The coded data corresponding to the whole image is followed by an EOC (End Of Codestream) marker to indicate the end of the code.

Figure 9:
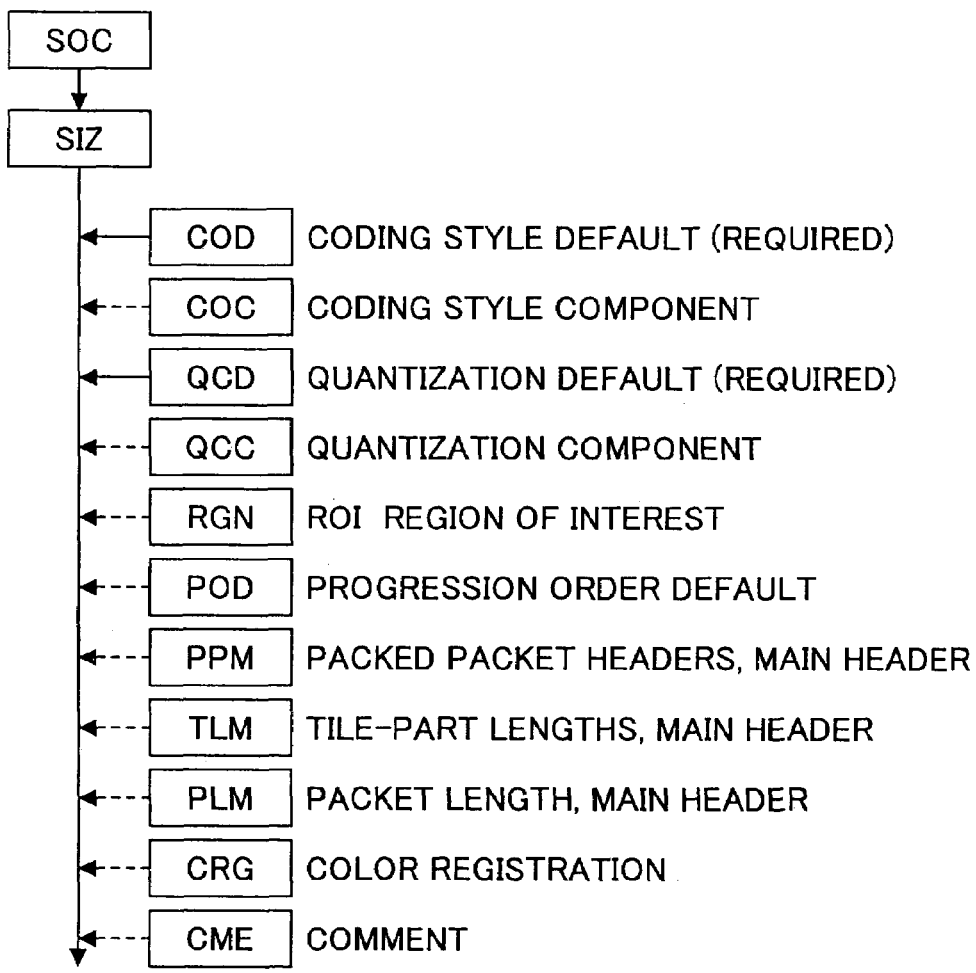
FIG. 9 is a diagram illustrating an exemplary structure of a main header in accordance with the JPEG 2000 standard.

FIG. 9 shows an exemplary structure of a main header. Referring to FIG. 9, the main header comprises required marker segments: COD (Coding style default) and QCD (Quantization default), and optional marker segments: COC (Coding style component), QCC (Quantization component), RGN (Region of interest), POD (Progression order default), PPM (Packed packet headers, main header), TLM (Tile-part lengths, main header), PLM (Packet length, main header), CRG (Color registration), and CME (Comment and extension).

FIGS. 10A and 10B show exemplary structures of a tile-part header. FIG. 10A shows a sequence of marker segments attached to the head of a tile-part header. Referring to FIG. 10A, the tile-part header comprises COD, COC, QCD, QCC, RGN, POD, PPT (Packed packet headers, tile-part header), PLT (Packet lengths, tile-part header), and CME, all of which are optional. FIG. 10B shows a sequence of marker segments attached to the head of a tile subsequence of a tile divided into a plurality of subsequences. Referring to FIG. 10B, the tile-part header comprises POC, PPT, PLT and CME, all of which are optional.

In the JPEG 2000 standard, a marker occupies two bytes in which the first byte has 0xFF and the second byte has 0x01 through 0xFE. Markers and marker segments are classified into the following six categories.
1. Delimiting
2. Fixed information
3. Functional
4. In bitstream
5. Pointer
6. Informational The categories "delimiting" and "fixed information" are associated with the present invention.

A delimiting marker or a delimiting marker segment, which is a required component, comprises SOC (Start of codestream), SOT (Start of tile-part), SOD (Start of data) and EOC (End of codestream). SOC is appended to the head of a code sequence. SOT is appended to the head of a tile-part.

FIG. 11 shows an exemplary structure of the SOT marker segment. Referring to FIG. 11, the SOT marker segment comprises Lsot indicating the length of the marker segment in bytes, Isot indicating the number of tiles in raster order starting at the number 0, Psot indicating the length of the tile-part in bytes, TPsot indicating the index of the tile-part, and TNsot indicating the number of tile-parts in the tile.

The fixed information marker segment, which is used to maintain image information, corresponds to a SIZ (image and tile size) maker segment. The SIZ marker segment is attached immediately after the SOC marker. The length of the SIZ marker segment depends on the number of components.

FIG. 12 shows an exemplary structure of the SIZ marker segment. Referring to FIG. 12, the SIZ marker segment comprises Lsiz, Rsiz, Xsiz, Ysiz, XOsiz, YOsiz, XTsiz, YTsiz, XTOsiz, YTOsiz, Csiz, Ssiz(i), XRsiz(i) and YRsiz (i). Lsiz has the length of the marker segment in bytes. Rsiz has capabilities of the codestream (0: fixed, others: reserved). Xsiz has the width of the reference grid. Ysiz has the height of the grid reference. XOsiz has the horizontal offset from the origin of the reference grid to the left side of the image area. YOsiz has the vertical offset from the origin of the reference grid to the top side of the image area. XTsiz has the width of one reference tile with respect to the reference grid. YTsiz has the height of one reference tile with respect to the reference grid. XTOsiz has the horizontal offset from the origin of the reference grid to the left side of the first tile. YTOsiz has the vertical offset from the origin of the reference grid to the top side of the first tile. Csiz has the number of components in the image. Ssiz(i) has precision (depth-) in bits and sign of the ith component. XRsiz(i) has the number of horizontal samples of the ith component. YRsiz has the number of vertical samples of the ith component.

Figure 13:
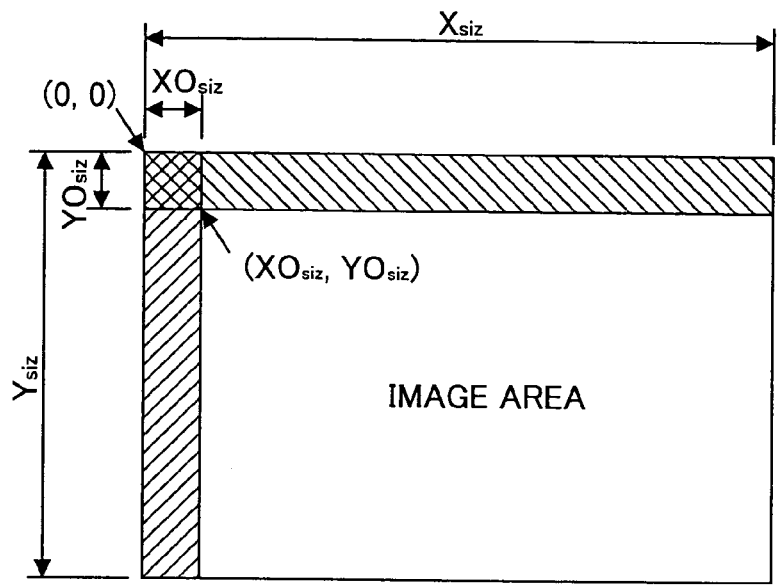
FIG. 13 is a diagram for explaining a placement scheme of an image through a reference grid in accordance with the JPEG 2000 standard.

In the JPEG 2000 standard, the positions of an image and a tile are represented on coordinate axes, which is called a reference grid, as illustrated FIG. 13.

FIG. 13 is a diagram for explaining a placement scheme of an image through the reference grid. Referring to FIG. 13, an image is disposed such that the upper left corner thereof is placed at the designated position (XOsiz, YOsiz) relative to the origin (0, 0) of the reference grid. The area of the image is computed from the product $(Xsiz-XOsiz) \times (Ysiz-YOsiz)$ When an image is encoded, the image on the reference grid is divided into rectangular areas, called tiles, as mentioned above.

Figure 14:
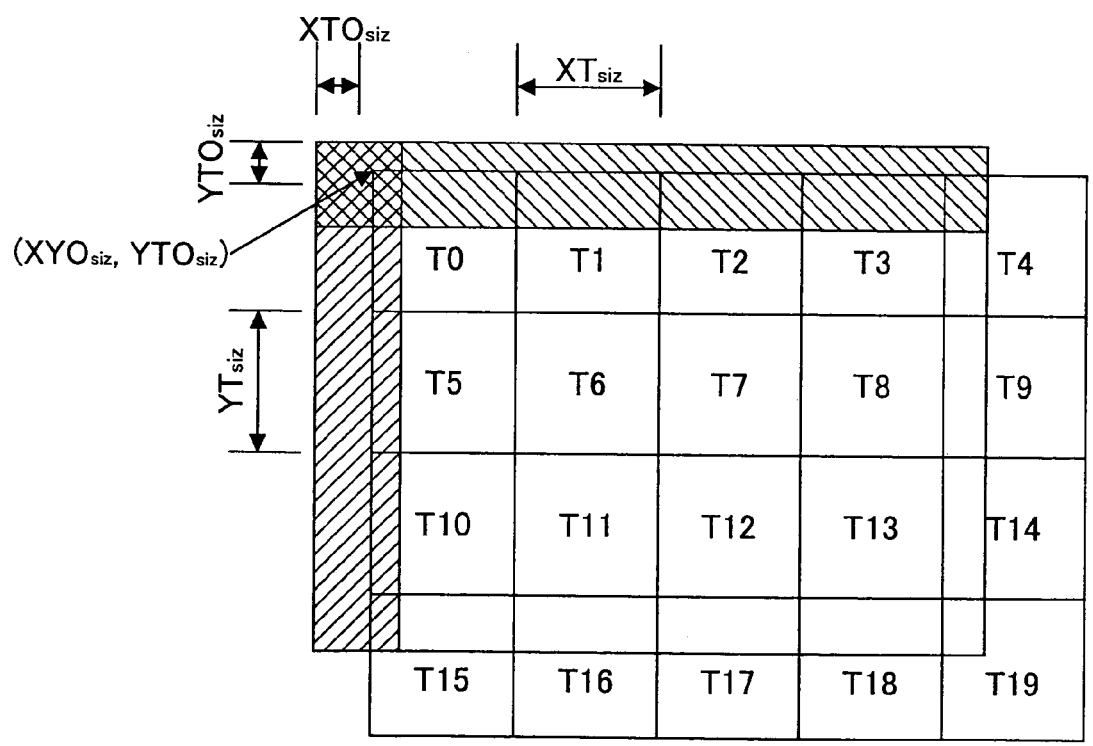
FIG. 14 is a diagram illustrating an exemplary relative location between a reference grid and tiles in accordance with the JPEG 2000 standard.

FIG. 14 shows an exemplary relative location between the reference grid and tiles. In the JPEG 2000 standard, each tile is encoded and decoded independently of all other tiles. For this reason, it is not allowed to refer to a pixel outside the tile. The position of a tile is designated based on the relative position (XTOsiz, YTOsiz) to the origin of the reference grid and the upper left corner of the first tile. The relationship among an image offset position, a tile offset position and a tile size satisfies the following formulae:

$0 \leq XTOsiz \leq XOsiz,$ $0 \leq YTOsiz \leq YOsiz,$ $XTsiz+XTOsiz>XOsiz$, and $YTsiz+YTOsiz>YOsiz$.

Also, the total number of tiles satisfies the following formulae;

(the number of tiles with respect to horizontal direction)=$(Xsiz-XTOsiz)/XTsiz$; and (the number of tiles with respect to vertical direction)=$(Ysiz-YTOsiz)/YTsiz$.

Figure 15:
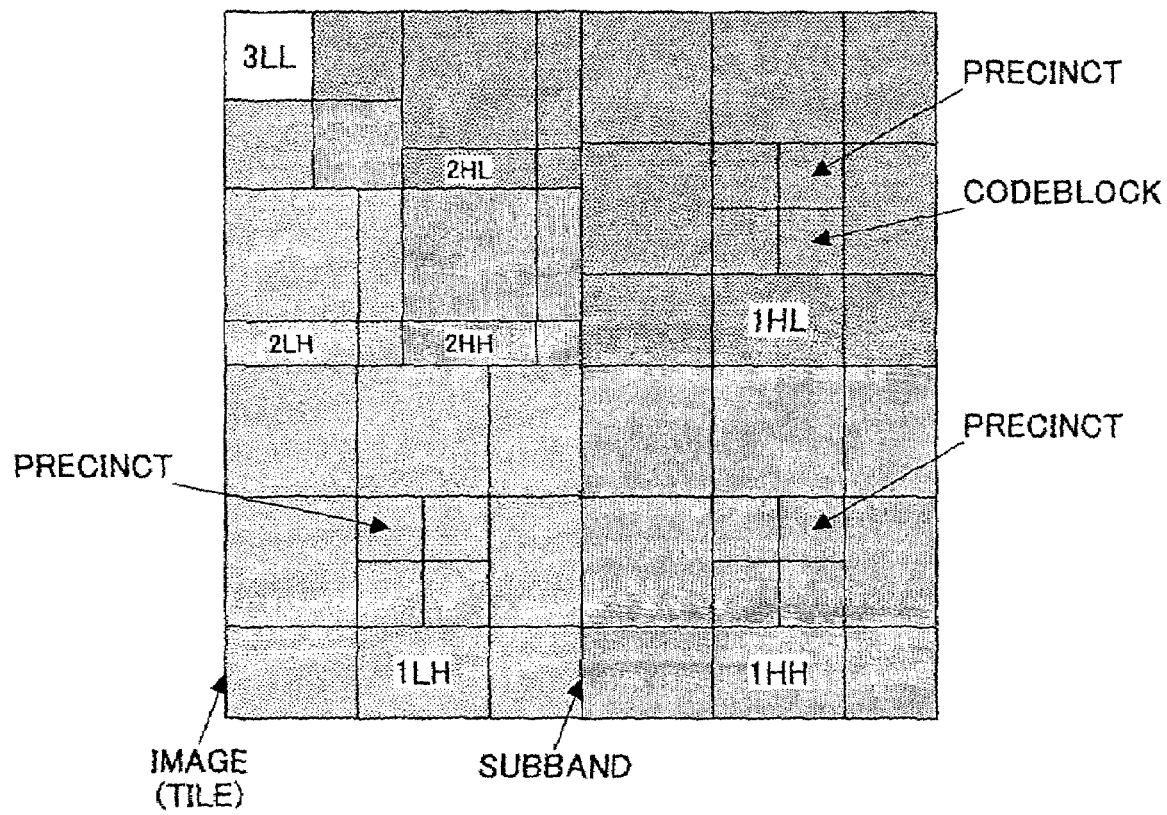
FIG. 15 is a diagram illustrating an exemplary physical relation of various types of blocks in accordance with the JPEG 2000 standard.

FIG. 15 shows an exemplary physical relation of various types of blocks in accordance with the JPEG 2000 standard. Referring to FIG. 15, an "image", a "tile", a "subband", a "precinct", and a "codeblock" are ordered with respect to physical sizes thereof as follows;

image ≧ tile ≧ subband ≧ precinct ≧ codeblock.

A tile is configured as a rectangular area that results from partition of an image, and if the partition number is equal to 1, the whole image is considered as one tile. A precinct comprises three rectangular areas, each of which results from partition of each of subbands HL, LH and HH. Here, if a precinct results from partition of an LL subband, the precinct comprises one rectangular area. Roughly speaking, a precinct can be used to identify a position within an image. A precinct may have the same size as its subband. A codeblock results from partition of a precinct.

A packet comprises a portion of coded data retrieved from all codeblocks in a precinct. For example, a packet may be formed of coded data of bitplanes of the most significant bit (MSB) through the third MSB for all codeblocks in a precinct. Here, it is noted that the term "portion" of the above definition may be interpreted as "none". In such a case, the corresponding packet includes no coded data. A layer comprises coded data that result from collection of packets for all precincts, equivalently, all codeblocks or all subbands. For example, a layer may be formed of coded data of biplanes of MSB through the third MSB of wavelet coefficients of an image. Roughly speaking, a layer is formed of a portion of coded data of bitplanes of the whole image. For this reason, the more layers are decoded, the quality of the underlying image is enhanced. In this sense, the layer can be considered as a scaling unit of image quality.

If all layers are collected, the collected layers are formed as coded data of all bitplanes of the whole image.

Figure 16:
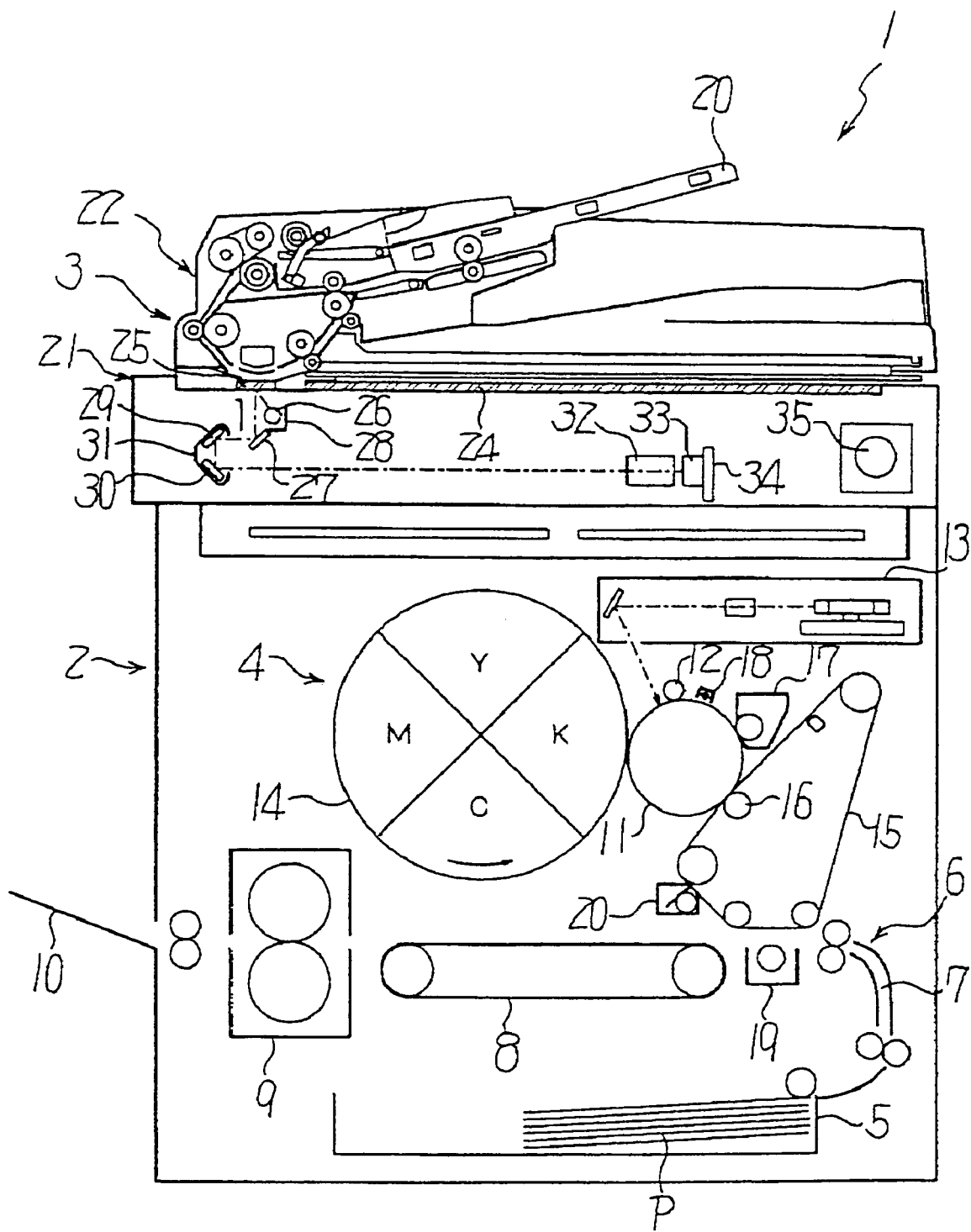
FIG. 16 is a diagram illustrating an exemplary structure of a digital color copier according to an embodiment of the present invention.
Figure 17:
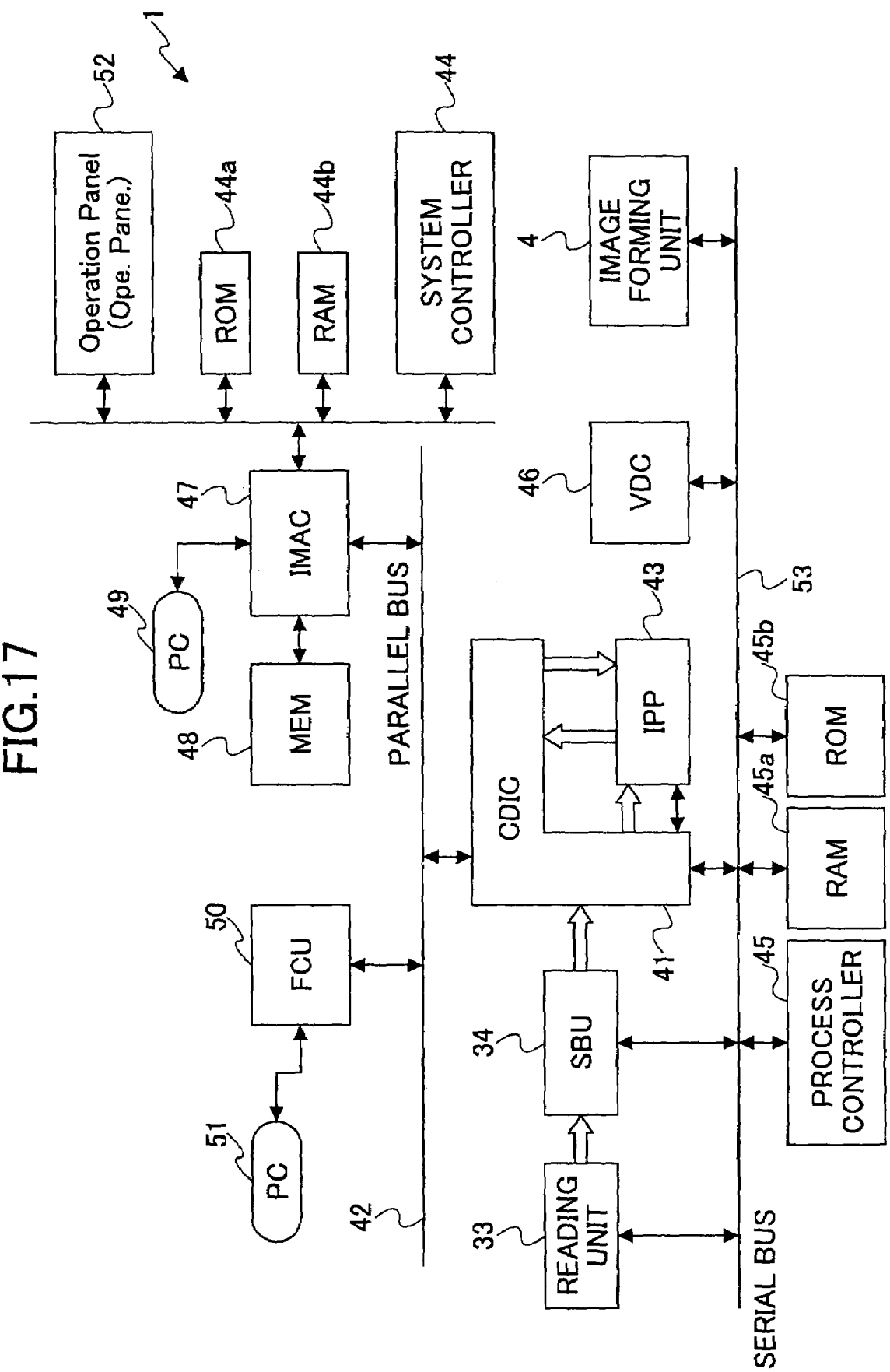
FIG. 17 is a block diagram illustrating electrical connections among components of the digital color copier according to the embodiment.
Figure 18:
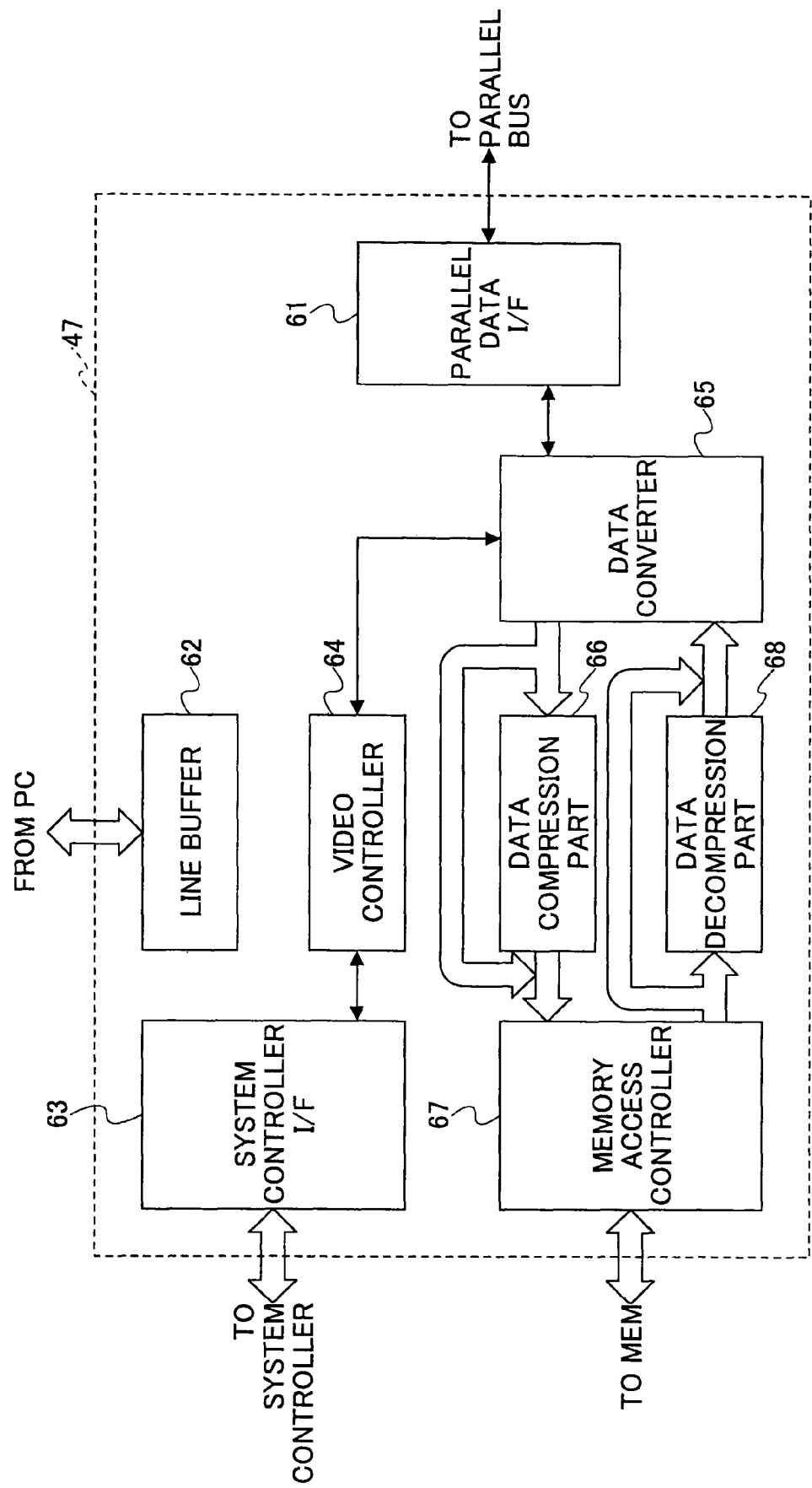
FIG. 18 is a block diagram illustrating an exemplary structure of IMAC of the digital color copier according to the embodiment.

A description is given, with reference to FIG. 16 through FIG. 18, of an exemplary structure of a digital color copier (image forming apparatus) having functions based on the above-mentioned JPEG 2000 standard according to an embodiment of the present invention. FIG. 16 shows an exemplary structure of a digital color copier 1 according to an embodiment of the present invention.

Referring to FIG. 16, the digital color copier 1 comprises a printer part 2 and a scanner part 3, which is disposed on the printer part 2. The printer part 2 works as a color printer that functions as a printer engine of the digital color copier 1. The scanner part 3 works as a color image scanner (image reading apparatus). Namely, the digital color copier 1 can work as a multifunction product.

Specifically, the printer part 2 comprises an image forming unit 4, a paper feeding part 5, a paper carrying part 6, a paper carrying path 7, a paper carrying belt 8, a fixing part 9 and an output tray 10. The image forming unit 4 electrophotographically forms an image based on image data that are optically read by the scanner part 3 or are supplied from an external device. The paper carrying part 6 carries a paper P, which is used as a recoding medium, from the paper feeding part 5 via the paper carrying path 7 in order to transfer the image onto the paper P. The paper carrying belt 8 carries the transferred paper P to the fixing part 9 to fix the image onto the paper P by applying heat and pressure to the paper P. The fixed paper P is supplied to the output tray 10.

The image forming unit 4 comprises a photoconductor 11, an electrifying part 12, an exposing part 13, a color developing part 14, an intermediate transferring part 16, a photoconductor cleaning part 17, a discharging part 18, a transferring part, and a belt cleaning part 20. The photoconductor 11 is formed as a drum-shaped rotatable object as illustrated in FIG. 16. The electrifying part 12, which is adjacent to the photoconductor 11, uniformly electrifies the circumferential surface of the photoconductor 11. The exposing part 13 exposes light on the uniformly electrified circumferential surface of the photoconductor 11 to form electrostatic color latent images on the photoconductor 11 based on given color-wise image data. In order to make the electrostatic color latent images visible, the revolving color developing part 14, as illustrated in FIG. 16, forms colorwise toner images by attaching toners of cyan (C), magenta (M), yellow (Y) and black (K), for example, to the respective color electrostatic latent images. The intermediate transferring part 16 sequentially transfers the color-wise toner images onto the intermediate transferring belt 15 tensed by a plurality of rollers, as illustrated in FIG. 16. The photoconductor cleaning part 17 sweeps away residual toners on the photoconductor 11. The discharging part 18 discharges the circumferential surface of the photoconductor 11 after the transferring. The transferring part 19 transfers all the toner images on the intermediate transferring belt 15 onto the paper P. The belt cleaning part 20 sweeps away residual toners on the intermediate transferring belt 15.

The scanner part 3 comprises a scanner body 21 and an automatic document feeder (ADF) 22 serving as a document carrying part disposed on the scanner body 21. A fixed document glass 24 and a carried document glass 25 are provided on the upper surface of a housing 23 of the scanner body 21. The fixed document glass 24 is used to place a document thereon, when the document is read in a document fixing mode. On the other hand, the carried document glass 25 is used to place a document thereon, when the document is read in a document carrying mode. Here, the document fixing mode is for reading a document that an operator places on the fixed document glass 24. On the other hand, the document carrying mode is for reading a document that the ADF 22 automatically feeds during passing across the carrying document glass 25.

A first moving body 28, which can be shifted in the sub-scanning direction across the fixed document glass 24, is disposed in the housing 23 to face the fixed document glass 24 from the lower side of the housing 23. As shown in FIG. 16, the first moving body 28 comprises a lamp (high intensity Xe lamp) 26 to illuminate a document and a mirror 27 to deflect reflected light (illustrated as dashed lines) from the document. Also, a second moving body 31, which can be shifted in the sub-scanning direction across the fixed document glass 24, is disposed on the reflected optical path (illustrated as dashed lines) emitted from the first moving body as illustrated in FIG. 16. The second moving body 31 comprises two mirrors 29 and 30. In addition, a sensor board unit (SBU) 34 is disposed on the reflected optical path from the second moving body 31 via a lens 32. SBU 34 includes a charge coupled device (CCD) 33 that functions as a photoelectric conversion element.

A stepping motor 35 is connected to the first and second moving bodies 28 and 31 via a pulley and a wire (not illustrated). The first and second moving bodies 28 and 31 can be shifted in the right direction in FIG. 16 at a speed ratio 2:1.

FIG. 17 is a block diagram illustrating electrical connections among components of the digital color copier 1. Referring to FIG. 17, CCD 33 of SBU 34 optically reads a document and generates an electric signal from the document. Then, the electric signal is converted into a digital image signal and is supplied to a compression/decompression and data interface control part (CDIC) 41. CDIC 41 controls transmission of image data between individual functional devices and data buses. Specifically, CDIC 41 controls transmission of image data among SBU 34, a parallel bus 42 and an image processing processor (IPP) 43. In addition, CDIC 41 manages communication of the image data between a system controller 44 and a process controller 45. ROM (Read Only Memory) 44a and RAM (Random Access Memory) 44b are prepared for the system controller 44. An image signal from SBU 34 is transmitted to IPP 43 via CDIC 41 to correct signal degradation (originating from the scanner body 3). This signal degradation is mainly caused by two factors: the photoelectric conversion of light read by the scanner part 3 into an electric signal, and the quantization of the electric signal into a digital image signal. The corrected image signal is supplied to CDIC 41.

The system controller 44, which comprises a central processing unit (CPU), controls components of the digital color copier 1 in accordance with control programs stored in ROM 44a. RAM 44b is used as a working memory of the system controller 44. In ROM 44a, image processing programs are stored for the system controller 44-. Through execution of the image processing programs, the system controller 44 controls the components and other control programs. In the digital color copier 1 according to the embodiment, image processing programs to implement various functions, which are described below, are stored in ROM 44a. In that sense, ROM 44a serves as a recording medium for storing the image processing programs. ROM 44a according to the embodiment comprises an Electronically Erasable and Programmable Read Only Memory (EEPROM) or a flush memory, for example, to make programs in ROM 44a rewritable. In order to download a program via a network, a network interface (not illustrated) may be provided to the digital color copier 1.

The digital color copier 1 can execute two kinds of jobs. According to one type of job, the digital color copier 1 stores images read by the reading unit (CCD) 33 in a memory, and reuses the stored images. According to the other type of job, the digital color copier 1 does not store images read by the reading unit 33. The former type of job is for a case where the digital color copier 1 is requested to produce a plurality of copies of a source document. In such a case, the digital color copier 1 reads the source document only once through the reading unit 33 and stores the read image in a memory. Then, the digital color copier 1 reads and outputs the stored image the number of times corresponding to the requested number of copies. The latter type of job is for a case where the digital color copier 1 is requested to produce just one copy of a source document. In such a case, since the digital color copier 1 directly prints out a read image without storing the image, the digital color copier 1 does not have to access a memory.

In the case where the digital color copier 1 uses no memory, after image data are transmitted from IPP 43 to CDIC 41, the image data are transmitted back to IPP 43. IPP 43 performs an image quality process for the purpose of area gradation of luminance data of the image data. Then, the processed image data are sent from IPP 43 to a video data controller (VDC) 46 to perform a post-process associated with a dot arrangement and control a pulse to reconstruct dots on the processed image data. The image forming unit 4, which serves as a printer engine to form an image electrophotographically, outputs the reconstructed image on a transferring paper P.

In the case where the digital color copier 1 uses a memory, the digital color copier 1 can perform additional processes on stored image data, for example, to rotate the image or synthesize the image and another image. In such a case, after image data are transmitted from IPP 43 to CDIC 41, the image data are sent to an image memory access controller (IMAC) 47. Under the control of the system controller 44, IMAC 47 manages an access of image data to a memory module (MEM) 48, which serves as a storage device. Then, IMAC 47 sends image data to be printed to an external personal computer (PC) 49, and compresses/decompresses the image data so as to make effective use of MEM 48. After compression of the image data, the coded data are stored in MEM 48. The stored coded data are read from MEM 48 according to necessity. When the coded data are read from MEM 48, the read coded data are decompressed into its underlying image data and the decompressed image data are delivered back to CDIC 41 via the parallel bus 42.

Then, the image data are transmitted from CDIC 41 to IPP 43, and IPP 43 performs an image quality process on the image data. Subsequently, VDC 46 performs a pulse control on the enhanced image data, and the image forming unit 4 forms an image on the transferred paper P based on the resulting image data.

In addition, the digital color copier 1, which serves as a multifunction product, comprises a FAX transmission function. According to the FAX transmission function, IPP 43 processes read image data and sends the processed image data to a FAX control unit (FCU) 50 via CDIC 41 and the parallel bus 42. FCU 50 converts the image data into FAX data so that the image data can be communicated to a communication network. Then, FCU 50 transmits the converted image data as FAX data to a public network (PN) 51. On the other hand, when the digital color copier 1 receives FAX data from PN 51, FCU 50 converts the FAX data into image data and transmits the converted image data to IPP 43 via the parallel bus 42 and CDIC 41. In this case, the digital color copier 1 performs no image quality process, and VDC 46 performs a dot arrangement and control a pulse on the sent image data. Then, the image forming unit 4 forms the image on a transferred paper P.

When the digital color copier 1 executes a plurality of jobs, such as a copy function, a FAX transmitting and receiving function and a printer output function, in parallel, the system controller 44 and the process controller 45 allocates permissions to use CCD 33, the image forming unit 4 and the parallel bus 42 to the plurality of jobs.

The process controller 45 controls flow of image data. The system controller 44 controls the whole digital color copier 1 and manages actuation of individual components of the digital color copier 1. ROM 45a and RAM 45b are prepared for the process controller 45.

A user selects various functions, such as the copy function and the FAX function, by manipulating an operation panel 52.

The system controller 44 and the process controller 45 communicates to each other via the parallel bus 42, CDIC 41 and the serial bus 53. At this time, a data format is converted to establish a data interface between the parallel bus 42 and the serial bus 53.

FIG. 18 is a block diagram illustrating an exemplary structure of IMAC 47. Referring to FIG. 18, IMAC 47 comprises a parallel data I/F 61, a line buffer 62, a system controller I/F 63, a video controller 64, a data converter 65, a data compression part 66, a memory access controller 67 and a data decompression part 68. The parallel data I/F 61 manages an interface for image data between IMAC 47 and the parallel bus 42. IMAC 47 controls to write/read image data in/from MEM 48 and decodes coded data supplied from the external PC 49 into image data. For example, MEM 48 may comprise a semiconductor memory, a hard disk or the both. The coded data from PC 49 are stored in a local area of the line buffer 62. Based on a decompression instruction supplied from the system controller 44 via the system controller I/F 63, the video controller 64 decompresses the coded data in the line buffer 62 into image data. The decompressed image data and image data supplied from the parallel bus 42 via the parallel data I/F 61 are stored in MEM 48. The data converter 65 selects image data to be stored. In order to improve memory efficiency, the data compression part 66 compresses the image data according to necessity. The memory access controller 67 controls an access to read the image data. The data decompression part 68 decompresses the read image data according to necessity. The data compression part 66 and the data decompression part 68 are required to perform encoding and decoding processes, respectively, in accordance with an efficient coding method suitable to save a memory area of MEM 48. Such an efficiency-priority coding method is different from a function-priority coding method for CDIC 41, and the digital color copier 1 adopts the JPEG 2000 standard as the efficiency-priority coding method. In this case, the data compression part 66 serves as an encoder to compress image data by performing two-dimensional discrete wavelet transform, quantization and encoding on the image data based on the JPEG 2000 standard. The data decompression part 68 serves as a decoder to decode coded data by performing decoding, dequantization and inverse two-dimensional discrete wavelet transform on the coded data based on the JPEG 2000 standard. The decompressed image data are transmitted to the parallel bus 42 via the parallel data I/F 61.

Figure 19:
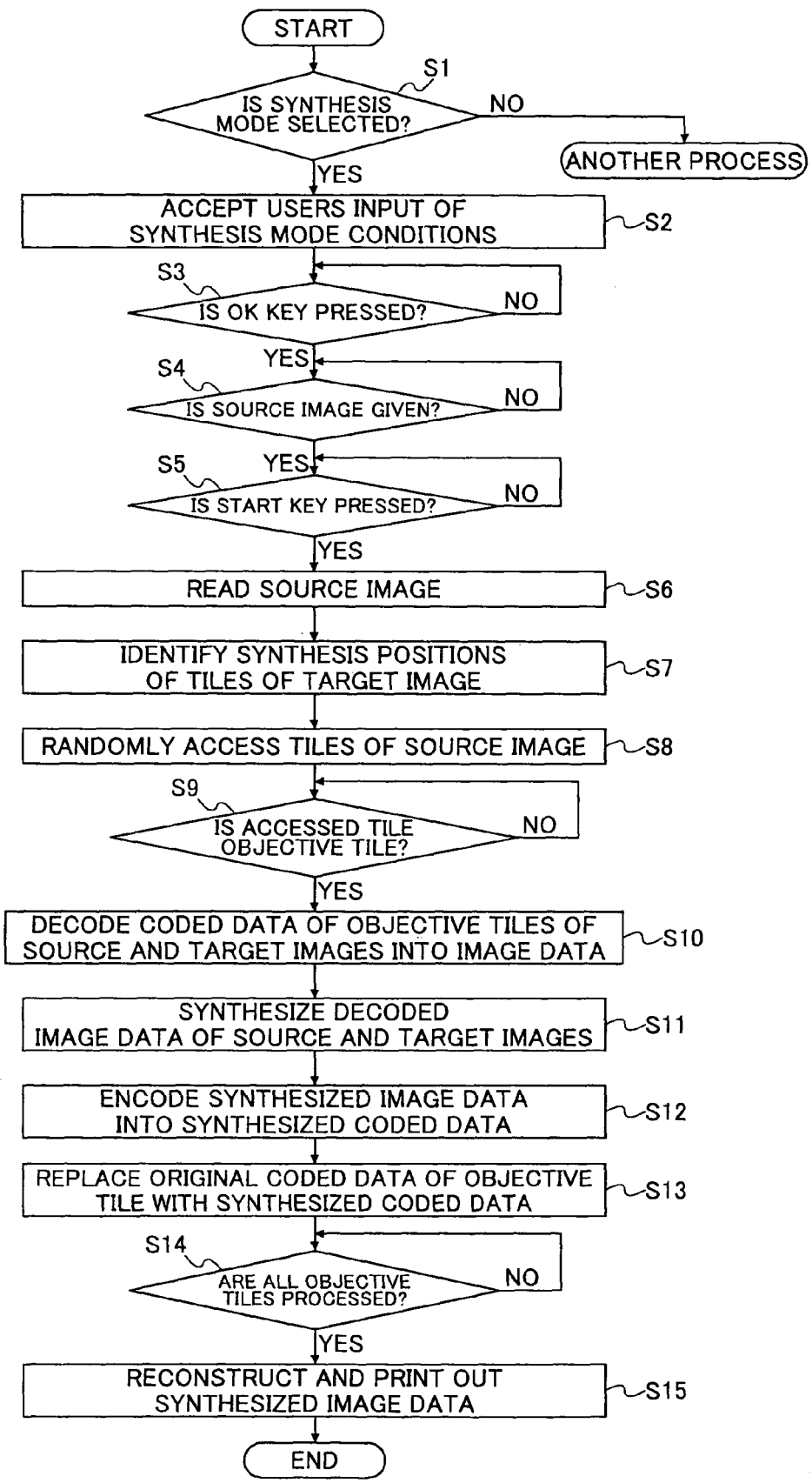
FIG. 19 is a flowchart of an image synthesis process according to a first embodiment of the present invention.

A description is given, with reference to FIG. 19 and FIG. 20, of an image synthesis process according to a first embodiment of the present invention.

The above-mentioned digital color copier 1 has an image synthesis mode as one of image editing functions thereof. The digital color copier 1 according to the present invention makes the most use of advantages of the JPEG 2000 standard, so that the digital color copier 1 can synthesize images by performing a decoding process on the corresponding coded data fewer execution times. In an image synthesis process according to the first embodiment, images are synthesized per tile including header information. In this case, the digital color copier 1 can perform the synthesis process on a tile independently of other tiles.

The digital color copier 1 may read a source image and a target image, which are to be synthesized, from underlying documents and then may temporarily store these images in MEM 48. However, the digital color copier 1 according to the first embodiment reads a target image, such as a predetermined image pattern, through the scanner part 3 in advance. Then, the digital color copier 1 compresses the read target image into coded data through the data compression part 66 in accordance with the JPEG 2000 standard, and stores the coded data in MEM 48. On the other hand, when the digital color copier 1 is requested to synthesize the target image and the source image, the digital color copier 1 reads the source image through the scanner part 3. Then, the digital color copier 1 compresses the read source image into coded data through the data compression part 66 in accordance with the JPEG 2000 standard, and stores the coded data in MEM 48. According to the embodiment, the digital color copier 1 synthesizes the target image and the source image by superposing the target image onto the source image at a designated position within the image area.

FIG. 19 is a flowchart of an image synthesis process executed by the system controller 44 according to the first embodiment. Referring to FIG. 19, the system controller 44 determines whether or not a user selects a synthesis mode through the operation panel 52 at step S1.

If the synthesis mode is selected (S1: YES), the system controller 44 accepts a user's input of synthesis mode conditions at step S2. As such an input of synthesis mode conditions, for example, there is a designation of a target image and a designation of the position where the target image is synthesized to a source image.

At step S3, the system controller 44 waits for an input of an "OK" key. If the user presses the OK key (S3: YES), the process control moves to step S4.

At step S4, the system controller 44 waits until the source image is provided to the scanner part 3. If the source image is provided (S4: YES), the process control moves to step S5.

At step S5, the system controller 44 waits until the user presses a start key. If the user presses the start key (S5: YES), the process control moves to step S6.

At step S6, the system controller 44 causes the scanner part 3 to read the source image. Then, the data compression part 66 compresses the read image data into coded data based on the JPEG 2000 standard, and the coded data are stored in MEM 48.

At step S7, the system controller 44 identifies synthesis positions of individual tiles of the target image based on the tiles and header information thereof in MEM 48 with reference to the synthesis mode conditions.

At step S8, the system controller 44 randomly accesses tiles of the coded data of the source image in MEM 48.

At step S9, the system controller 44 determines whether or not an accessed tile is located in one of the identified synthesis positions, in other words, whether or not the accessed tile is an objective tile. Steps S8 and S9 are collectively implemented by a search part or a search function.

If the accessed tile is an objective tile (S9: YES), the data decompression part 68 decompresses coded data of the objective tiles of the source image and the target image into image data and then stores the decompressed image data in RAM 44b at step S10. Step S10 is implemented as an objective image reconstruction part or an objective image reconstruction function.

At step S11, the system controller 44 synthesizes reconstructed image data of the source image and the target image in RAM 44b. Step S11 is implemented by an objective image synthesis part or an objective image synthesis function.

At step S12, the data compression part 66 compresses the synthesized image data into coded data based on the JPEG 2000 standard.

At step S13, the system controller 44 replaces coded data of the objective tile of the source image with the newly coded data and stores the resulting coded data in MEM 48.

Steps S12 and S13 are collectively implemented by an objective image re-encoding part or an objective image re-encoding function.

Steps S10 through S13 are collectively implemented by an objective block synthesis part or an objective block synthesis function.

At step S14, the system controller 44 determines whether or not all objective tiles of the target image to be synthesized have been processed. If there is an objective tile that has not been processed, the process control returns to step S7. The system controller 44 repeats the above-mentioned process until all the objective tiles are processed.

At step S15, the decompression part 68 decompresses the synthesized coded data in MEM 48 into image data. The system controller 44 delivers the decompressed image data to IPP 43 via IMAC 47, the parallel bus 42 and CDIC 41. IPP 43 performs an image quality process on the image data and supplies to the enhanced image data to VDC 46. VDC 46 performs a pulse control on the image data and supplies the resulting image data to the image forming unit 4. The image forming unit 4 forms and outputs an image on a transferred paper P based on the processed image data as the synthesized copy image.

FIGS. 20A through 20C are diagrams illustrating an example for explaining the above-mentioned synthesis process.

FIG. 20A shows coded data of an exemplary source image. Referring to FIG. 20A, the source coded data are partitioned into tiles TA01 through TA20. FIG. 20B shows coded data of an exemplary target image. Referring to FIG. 20B, the target coded data are partitioned into tiles TB08, TB09, TB13 and TB14. In this example, the four tiles of the target image are synthesized at the corresponding positions, that is, TA08, TA09, TA13 and TA14, to the source image.

In accordance with the above-mentioned synthesis process, for example, if the tiles TA08 and TA09 are detected as objective tiles located at the synthesis positions corresponding to the tiles TB08 and TB09 at step S9, source coded data of the tiles TA08 and TA09 are reconstructed into source image data at step S10. At the same time, target coded data of the tiles TB08 and TB09 are reconstructed into target image data. Similarly, the system controller 44 decodes the tiles TA13, TA14, TB13 and TB14 into image data.

Then, the system controller 44 synthesizes the decoded image data of the tile TA08 and the decoded image data of the tile TB08 on RAM 44b at step S11. Similarly, the system controller 44 synthesizes decoded image data for each pair of the remaining tiles: TA09 and TB09, TA13 and TB13, and TA14 and TB14.

After the synthesis, the synthesized image data are encoded at step S12. For example, the image data synthesized from the tiles TA08 and TB08 are encoded into a synthesized tile TC08. Similarly, synthesized tiles TC09, TC13 and TC14 are generated. Then, the synthesized tiles TC08, TC09, TC13 and TC14 are replaced with the tiles TA08, TA09, TA13 and TA14 in MEM 48 at step S13.

According to the above-mentioned synthesis process, the synthesis process makes the most use of the JPEG 2000 standard. The JPEG 2000 standard handles an arbitrarily sized rectangular block such as a tile as a processed unit. For this reason, it is possible to identify coded data corresponding to an image portion (objective block) to be synthesized. In addition, since the coded data of the objective block are not related to information on other blocks, in other words, since the coded data of the objective block can be wavelet transformed and inverse wavelet transformed independently of other blocks, it is possible to decode the coded data per tile having header information independently of other tiles.

In the synthesis process, objective tiles corresponding to synthesis positions are detected per tile with reference to such header information, and the synthesis process is performed per tile on coded data of the detected objective tiles. As a result, it is possible to properly synthesize a source image and a target image by processing a small portion of the coded data without decoding whole coded data of the images. Accordingly, it is possible to provide an image processing apparatus that can operate at a higher speed with less use of a working memory (RAM 44b). In particular, when the image processing apparatus performs a synthesis process, for example, superposition of a target image onto a source image as in the above-mentioned embodiment, it is sufficient that the image processing apparatus performs an encoding process and a synthesis process per tile on coded data. Accordingly, the image processing apparatus can operate at a higher speed with less use of a working memory (RAM 44b) compared to the case where whole coded data are reconstructed.

Figure 21:
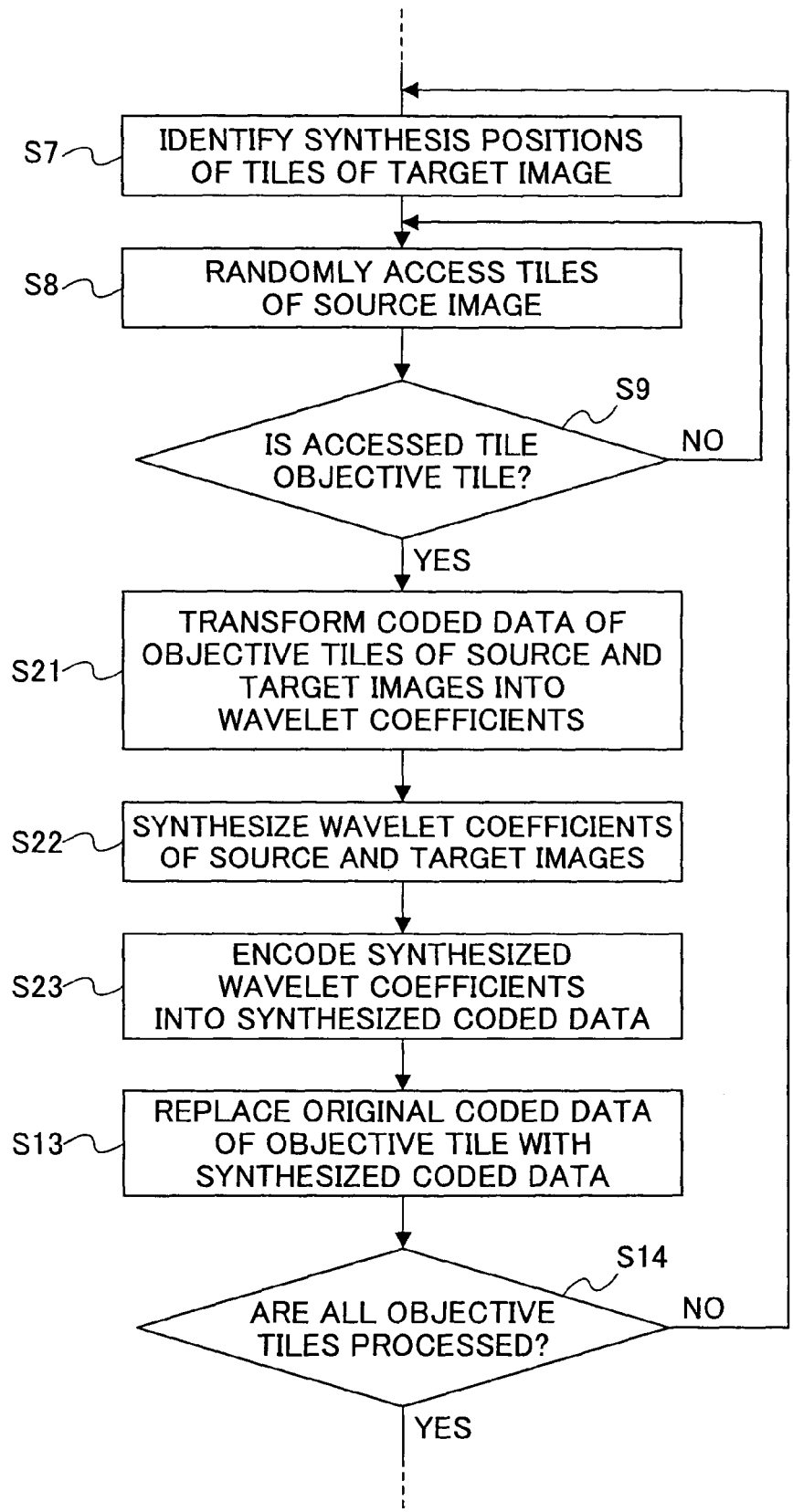
FIG. 21 is a portion of a flowchart of an image synthesis process according to a second embodiment of the present invention.

A description is given, with reference to FIG. 21 and FIG. 22, of a synthesis process according to a second embodiment of the present invention. The synthesis process is different from that according to the first embodiment in that steps S10 through S12 to reconstruct coded data into image data are replaced with steps S21 through S23 to reconstruct coded data into wavelet coefficients. For this reason, steps S21 through S23 are intensively described in the following.

FIG. 21 is a portion of a flowchart of the synthesis process according to the second embodiment. Referring to FIG. 21, if an objective tiles corresponding to one of identified synthesis positions is detected (S9: YES), the data decompression part 68 partially decodes coded data of the objective tile of the source and target images, that is, the decompression part 68 performs only an inverse wavelet transform on the coded data to reconstruct not image data but wavelet coefficients. Then, the system controller 44 stores the reconstructed wavelet coefficients in RAM 44b at step S21. Step S21 is implemented by an objective wavelet coefficient reconstruction part and an objective wavelet coefficient reconstruction function.

At step S22, the system controller 44 synthesizes the wavelet coefficients of the source and target images in RAM 44b. Step S22 is implemented by an objective wavelet coefficient synthesis part and an objective wavelet coefficient synthesis function.

At step S23, the data compression part 66 transforms the synthesized wavelet coefficients into coded data in accordance with the JPEG 2000 standard.

At step S13, the system controller 44 replaces original coded data of the objective tile of the source coded data in MEM 48 with the newly coded data. Steps S23 and S13 are implemented by an objective wavelet coefficient re-encoding part and an objective wavelet coefficient re-encoding function. Then, the resulting coded data are stored in MEM 48. The above-mentioned process are repeated until all objective tiles are processed.

Steps S21, S22, S23 and S13 are implemented as the objective block synthesis part and the objective block synthesis function.

FIGS. 22A through 22C are diagram illustrating an example for explaining the synthesis process according to the second embodiment.

FIG. 22A shows coded data of an exemplary source image as in FIG. 20A. Referring to FIG. 22A, the source coded data are partitioned into tiles TA01 through TA20. FIG. 22B shows coded data of an exemplary target image as in FIG.

20B. Referring to FIG. 22B, the target coded data are partitioned into tiles TB08, TB09, TB13 and TB14. In this example, the four tiles of the target image are synthesized to the corresponding tiles TA08, TA09, TA13 and TA14, of the source image.

In accordance with the above-mentioned synthesis process, for example, if the tiles TA08 and TA09 are detected as objective tiles corresponding to the tiles TB08 and TB09 at step S9, source coded data of the tiles TA08 and TA09 are reconstructed into wavelet coefficients at step S21. At the same time, target coded data of the tiles TB08 and TB09 are reconstructed into wavelet coefficients. Similarly, the system controller 44 decodes coded data of the tiles TA13, TA14, TB13 and TB14 into wavelet coefficients.

Then, the system controller 44 synthesizes the reconstructed wavelet coefficients of the tile TA08 and the reconstructed wavelet coefficients of the tile TB08 on RAM 44b at step S22. Similarly, the system controller 44 synthesizes reconstructed wavelet coefficients for each pair of the remaining tiles: TA09 and TB09, TA13 and TB13, and TA14 and TB14.

After the synthesis, the synthesized wavelet coefficients are encoded at step S23. For example, the wavelet coefficients synthesized from the tiles TA08 and TB08 are encoded into a synthesized tile TC08. Similarly, synthesized tiles TC09, TC13 and TC14 are generated. Then, the system controller 44 replaces original coded data of the tiles TA08, TA09, TA13 and TA14 in MEM 48 with the synthesized coded data of the tiles TC08, TC09, TC13 and TC14 at step S13.

According to the above-mentioned synthesis process, the synthesis process is fundamentally similar to that according to the first embodiment. In the synthesis process according to the second embodiment, however, the data decompression part 66 does not thoroughly decode coded data into image data. As mentioned above, the data decompression part 66 decodes the coded data into not image data but wavelet coefficients, and the wavelet coefficients are used for the synthesis process. After completion of the synthesis process, the synthesized wavelet coefficients are encoded into coded data again. As a result, it is possible to provide an image processing apparatus that can operate with less use of a working memory (RAM 44b) at a further higher speed compared to the case where coded data are thoroughly decoded into image data.

Meanwhile, in the above-mentioned overview of the JPEG 2000 standard, an image is decomposed into RGB components in accordance with a predetermined RGB chromatic system, as appreciated by those skilled in the art. In order to improve compression rates and enhance the image quality of the reconstructed image, for example, the color space transform part 101 transforms an RGB image into a YCbCr image, as appreciated by those skilled in the art. There is a reversible component transformation (RCT) method in which transform formulae thereof have integer coefficients as follows;

$G = Yr - \lfloor (Ur+Vr)/4 \rfloor$, $R = Ur + G$, $B = Vr + G$, $Yr = \lfloor (R+2G+B)/4 \rfloor$, $Ur = R - G$, and $Vr = B - G$, where Yr represents an luminance component, and Ur and Vr represent color difference components. In the above-mentioned synthesis process, if color images are handled, the luminance component Yr more strongly affects the image quality of the synthesized image. The above-mentioned compression and decompression processes are performed per tile on each of the components Yr, Ur and Vr. For this reason, it is possible to improve the image quality by adjusting weights provided to the YrUrVr-components of a source image. Specifically, if the weights are properly adjusted in the compression process, it is possible to make the quantization step of the synthesized luminance component Yr smaller than those of the color difference components Ur and Vr. This weight adjustment is implemented by a color image processing part and a color image processing function.

Figure 23:
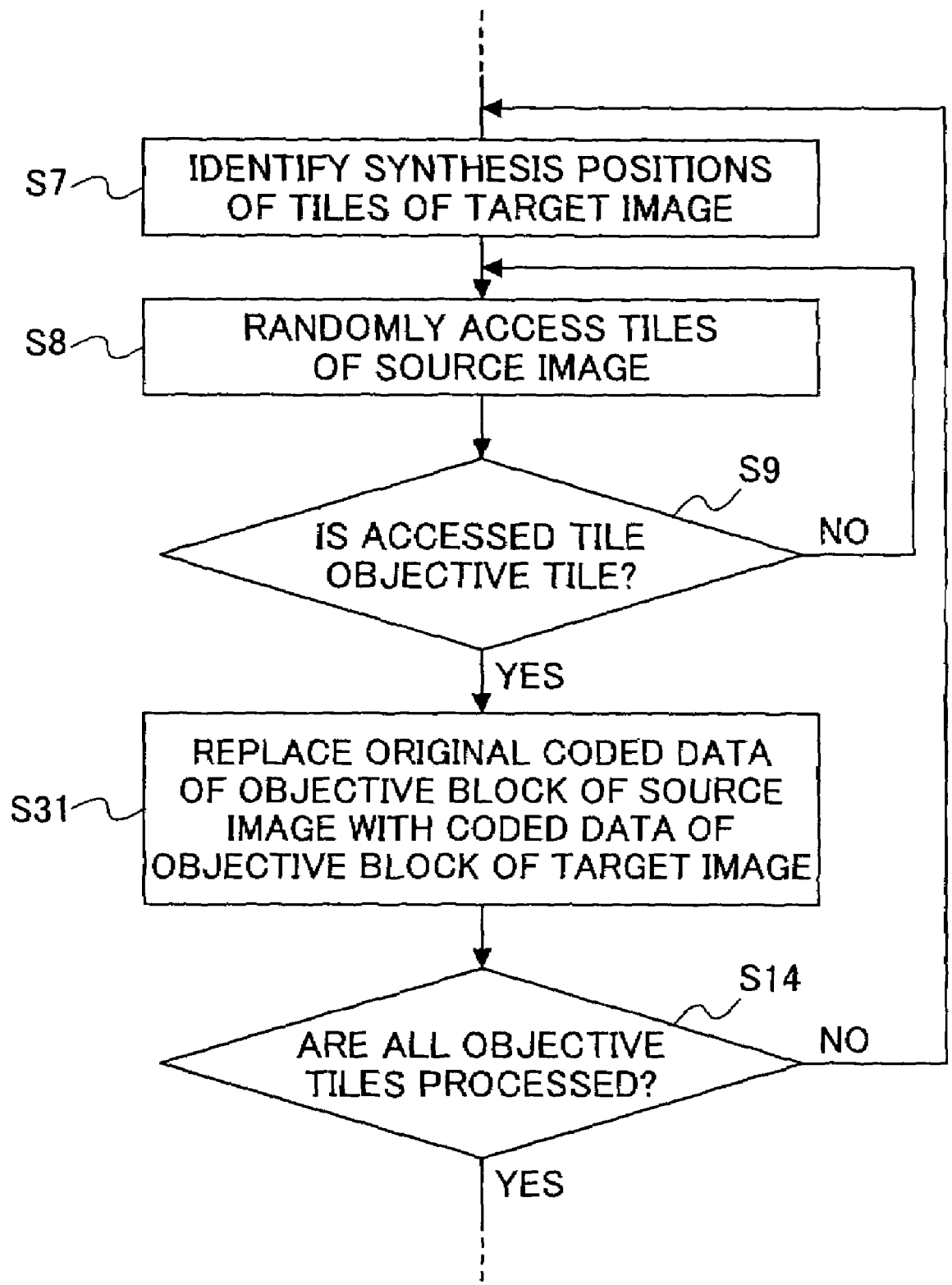
FIG. 23 is a portion of a flowchart of an image synthesis process according to a third embodiment of the present invention.

A description is given, with reference to FIG. 23 and FIG. 24, of a synthesis process according to a third embodiment of the present invention. This synthesis process is almost similar to those according to the first and second embodiments. However, the synthesis process according to the third embodiment is different in that steps S10 through S13 in the first embodiment or steps S21 through S23 and S13 in the second embodiment are replaced with step S31.

FIG. 23 is a portion of a flowchart of a synthesis process according to the third embodiment. Referring to FIG. 23, if an objective tile corresponding to one of the identified synthesis positions is detected (S9: YES), the system controller 44 simply replaces original coded data of the objective tile of the source image in MEM 48 with coded data of the objective tile of the target image at step S31. Step S31 is implemented by both a coded data replacement part and an objective block synthesis part or both a coded data replacement function and an objective block synthesis function. After the replacement, the resulting coded data are stored in MEM 48. The above-mentioned process is repeated for all objective tiles.

FIGS. 24A through 24C are diagrams illustrating an example for explaining the above-mentioned synthesis process. FIG. 24A shows coded data of an exemplary source image as in FIGS. 20A and 22A. Referring to FIG. 24A, the source coded data are partitioned into tiles TA01 through TA20. FIG. 24B shows coded data of an exemplary target image as in FIGS. 20B and 22B. Referring to FIG. 24B, the target coded data are partitioned into tiles TB08, TB09, TB13 and TB14. In this example, the four tiles of the target image are synthesized to the corresponding tiles TA08, TA09, TA13 and TA14, of the source image.

In accordance with the above-mentioned synthesis process, for example, if the tiles TA08 and TA09 are detected as objective tiles corresponding to the tiles TB08 and TB09 at step S9, original coded data of the tiles TA08 and TA09 are replaced with coded data of the tiles TB08 and TB09, and the resulting coded data are stored in MEM 48 at step S31. Similarly, original coded data of the tiles TA13 and TA14 are replaced with coded data of the tiles TB13 and TB14.

According to the above-mentioned synthesis process, for example, if a target image is attached to a white background area of a source image, an image processing apparatus can complete the synthesis process simply by alternating coded data of the objective tiles between the source image and the target image. As a result, it is possible to provide an image processing apparatus that can complete the synthesis process on coded data without any encoding/decoding process. In this case, since the image processing apparatus does not have to perform an encoding process or a decoding process, the image processing apparatus can operate at a further higher speed without any working memory for coding processes.

In the above-mentioned embodiments, a tile having header information is used as a block unit. According to the JPEG 2000 standard, a codeblock or a set of codeblocks (precinct), which are described above, may be used as a block unit that can be processed independently. Instead of a tile unit, the synthesis process according to the present invention may be performed per codeblock or precinct.

In the above-mentioned embodiments, the inventive synthesis process is applied to the digital color copier 1. However, a simpler scanner (image reading apparatus) is configured by removing the image forming unit 4, VbC 46 and FCU 50 from the digital color copier 1, and the synthesis process may be applied to the scanner in such a way that synthesized coded data are supplied to PC 49 or other external devices.

The present invention is not limited to the specifically disclosed embodiments, and variations and modifications may be made without departing from the scope of the present invention.

The present application is based on Japanese Patent Priority Application No. 2002-266573 filed Sep. 12, 2002, the entire contents of which are hereby incorporated by reference.

What is claimed is:

1. An image processing apparatus for synthesizing a source image and a target image by positioning the target image in a designated synthesis area in the source image, comprising:
   a search part searching coded data of the source image per predetermined independently processable block for an objective block corresponding to the designated synthesis area;
   an objective block synthesis part synthesizing detected coded data of the objective block of the source image and coded data of the objective block of the target image, the coded data being encoded in accordance with a JPEG 2000 standard;
   an encoder encoding image data into coded data by performing two-dimensional wavelet transform, quantization, and encoding on the image data in accordance with the JPEG 2000 standard; and
   a decoder decoding the coded data into the image data by performing inverse two-dimensional wavelet transform, dequantization, and decoding on the coded data in accordance with the JPEG 2000 standard.

2. The image processing apparatus as claimed in claim 1, wherein the objective block synthesis part comprises:
   an objective image reconstruction part using the decoder to decode the coded data of the objective block of the source image into image data of the objective block of the source image and the coded data of the objective block of the target image into image data of the objective block of the target image;
   an objective image synthesis part synthesizing the decoded image data of the objective block of the source image and the decoded image data of the objective block of the target image; and
   an objective image re-encoding part using the encoder to encode the synthesized image data of the objective block into synthesized coded data again and replacing the original coded data of the objective block of the source image with the synthesized coded data.

3. The image processing apparatus as claimed in claim 1, wherein the objective block synthesis part comprises:
   an objective wavelet coefficient reconstruction part using the decoder to perform the two-dimensional wavelet transform on the coded data of the objective block of the source image and the coded data of the objective block of the target image, thereby reconstructing a wavelet coefficient of the objective block of the source image and a wavelet coefficient of the objective block of the target image;
   an objective wavelet coefficient synthesis part synthesizing the reconstructed wavelet coefficient of the objective block of the source image and the reconstructed wavelet coefficient of the objective block of the target image and
   an objective wavelet coefficient re-encoding part using the encoder to encode the synthesized wavelet coefficient of the objective block into synthesized coded data again and replacing the original coded data of the objective block of the source image with the synthesized coded data.

4. The image processing apparatus as claimed in claim 1, wherein the block comprises a tile having header information.

5. The image processing apparatus as claimed in claim 1, wherein the block comprises a precinct.

6. The image processing apparatus as claimed in claim 1, wherein the block comprises a codeblock.

7. The image processing apparatus as claimed in claim 1, wherein the objective block synthesis part, when at least one of the source image and the target image is a color image, comprises a color image processing part providing weights to a luminance signal component and a color difference signal component of the source image so that a luminance signal component of a synthesized image has a smaller quantization step size than a color difference signal component thereof does.

8. The image processing apparatus as claimed in claim 1, further comprising an output part outputting synthesized coded data to an exterior thereof.

9. An image reading apparatus, comprising:
   a photoelectric conversion element reading an image and generating image data from the image;
   a coding part encoding the image data into coded data and decoding the coded data into the image data in accordance with a JPEG 2000 standard;
   a storage part maintaining coded data; and
   an image processing apparatus for synthesizing a source image and a target image by positioning the target image in a designated synthesis area in the source image, comprising: a search part searching coded data of the source image per predetermined independently processable block for an objective block corresponding to the designated synthesis area; an objective block synthesis part synthesizing detected coded data of the objective block of the source image and coded data of the objective block of the target image, the coded data being encoded in accordance with a JPEG 2000 standard; an encoder encoding image data into coded data by performing two-dimensional wavelet transform, quantization, and encoding on the image data in accordance with the JPEG 2000 standard; and a decoder decoding the coded data into the image data by performing inverse two-dimensional wavelet transform, dequantization, and decoding on the coded data in accordance with the JPEG 2000 standard,
   wherein the storage part maintains at least one of coded data encoded from the source image and coded data encoded from the target image.

10. An image forming apparatus, comprising:
an image reading apparatus, comprising: a photoelectric conversion element reading an image and generating image data from the image; a coding part encoding the image data into coded data and decoding the coded data into the image data in accordance with a JPEG 2000 standard; a storage part maintaining coded data; and an image processing apparatus for synthesizing a source image and a target image by positioning the target image in a designated synthesis area in the source image, comprising: a search part searching coded data of the source image per predetermined independently processable block for an objective block corresponding to the designated synthesis area; an objective block synthesis part synthesizing detected coded data of the objective block of the source image and coded data of the objective block of the target image, the coded data being encoded in accordance with a JPEG 2000 standard; an encoder encoding image data into coded data by performing two-dimensional wavelet transform, quantization, and encoding on the image data in accordance with the JPEG 2000 standard; and a decoder decoding the coded data into the image data by performing inverse two-dimensional wavelet transform, dequantization, and decoding on the coded data in accordance with the JPEG 2000 standard, wherein the storage part maintains at least one of coded data encoded from a source image and coded data encoded from a target image; and
a printer engine forming an image on a paper based on image data decoded from output coded data of the image reading apparatus by the coding part.

11. A computer-readable recording medium for storing a program to cause a computer of an image processing apparatus to execute a procedure of processing an image wherein the image processing apparatus is for synthesizing a source image and a target image by positioning the target image in a designated synthesis area in the source image, the procedure comprising:
a search function searching coded data of the source image per predetermined independently processable block for an objective block corresponding to the designated synthesis area;
an objective block synthesis function synthesizing detected coded data of the objective block of the source image and coded data of the objective block of the target image, the coded data being encoded in accordance with a JPEG 2000 standard;
an encoding function encoding image data into coded data by performing two-dimensional wavelet transform, quantization, and encoding on the image data in accordance with the JPEG 2000 standard; and
a decoding function decoding the coded data into the image data by performing inverse two-dimensional wavelet transform, quantization, and encoding on the image data in accordance with the JPEG 2000 standard; and
a decoding function decoding the coded data into the image data by performing inverse two-dimensional wavelet transform, dequantization and decoding on the coded data in accordance with the JPEG 2000 standard.

12. The computer-readable recording medium as claimed in claim 11, wherein the objective block synthesis function comprises:
an objective image reconstruction function using the decoding function to decode the coded data of the objective block of the source image into image data of the objective block of the source image and the coded data of the objective block of the target image into image data of the objective block of the target image;
an objective image synthesis function synthesizing the decoded image data of the objective block of the source image and the decoded image data of the objective block of the target image; and
an objective image re-encoding function using the encoding function to encode the synthesized image data of the block into synthesized coded data again and replacing the coded data of the block of the source image with the synthesized coded data.

13. The computer-readable recording medium as claimed in claim 11, wherein the objective block synthesis function comprises:
an objective wavelet coefficient reconstruction function using the decoding function to perform the two-dimensional wavelet transform on the coded data of the objective block of the source image and the coded data of the objective block of the target image, thereby reconstructing a wavelet coefficient of the objective block of the source image and a wavelet coefficient of the objective block of the target image;
an objective wavelet coefficient synthesis function synthesizing the reconstructed wavelet coefficient of the objective block of the source image and the reconstructed wavelet coefficient of the objective block of the target image; and
an objective wavelet coefficient re-encoding function using the encoding function to encode the synthesized wavelet coefficient of the block into synthesized coded data again and replacing the coded data of the block of the source image with the synthesized coded data.

14. The computer-readable recording medium as claimed in claim 11, wherein the block comprises a tile having header information.

15. The computer-readable recording medium as claimed in claim 11, wherein the block comprises a precinct.

16. The computer-readable recording medium as claimed in claim 11, wherein the block comprises a codeblock.

17. The computer-readable recording medium as claimed in claim 11, wherein the objective block synthesis function, when at least one of the source image and the target image is a color image, comprises a color image processing function providing weights to a luminance signal component and a color difference signal component of the source image so that a luminance signal component of a synthesized image has a smaller quantization step size than a color difference signal component thereof does.

* * * * *